US012697569B2

(12) United States Patent
Hassounah et al.

(10) Patent No.: US 12,697,569 B2
(45) Date of Patent: Aug. 4, 2026

(54) FILTER MEDIA COMPRISING A POLYETHERSULFONE-BASED FINE FIBER LAYER

(71) Applicant: Hollingsworth & Vose Company, East Walpole, MA (US)

(72) Inventors: Ibrahim Hassounah, Roanoke, VA (US); Narendiran Vitchuli, Roanoke, VA (US); Abdoulaye Doucouré, Roanoke, VA (US); Sneha Swaminathan, Merrimack, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 461 days.

(21) Appl. No.: 16/936,826

(22) Filed: Jul. 23, 2020

(65) Prior Publication Data

US 2022/0023784 A1 Jan. 27, 2022

(51) Int. Cl.
*B01D 39/00* (2006.01)
*B01D 39/16* (2006.01)
*B01D 39/18* (2006.01)

(52) U.S. Cl.
CPC ......... *B01D 39/1623* (2013.01); *B01D 39/18* (2013.01); *B01D 2239/0622* (2013.01); *B01D 2239/0631* (2013.01); *B01D 2239/0654* (2013.01); *B01D 2239/1216* (2013.01); *B01D 2239/1233* (2013.01)

(58) Field of Classification Search
CPC ........ B01D 39/1623; B01D 2239/0622; B01D 2239/0631; B01D 2239/0654; B01D 2239/1216; B01D 2239/1233; B01D 39/18; B01D 67/00042; B01D 69/02; B01D 2239/025; B01D 39/1692; B01D 39/2003; B01D 69/10; B01D 71/68; B01D 2239/0627; B01D 2239/0668; B01D 2239/0686; B01D 2239/1225; B01D 2239/125; B01D 39/1615; B01D 39/2017; B01D 2239/1258; B01D 2239/1291; B01D 2325/0283; B01D 2325/24; C02F 1/001; C02F 2303/04
USPC ......................................................... 55/487
See application file for complete search history.

(56) References Cited

U.S. PATENT DOCUMENTS

| | | | |
|---|---|---|---|
| 5,580,459 | A | 12/1996 | Powers et al. |
| 5,672,399 | A | 9/1997 | Kahlbaugh et al. |
| 5,785,725 | A | 7/1998 | Cusick et al. |

(Continued)

FOREIGN PATENT DOCUMENTS

| | | |
|---|---|---|
| EP | 2 561 127 B1 | 1/2015 |
| JP | 2017-155385 A | 9/2017 |

(Continued)

OTHER PUBLICATIONS

Homaeigohar. Functional Electrospun Nanofibrous Membrances for water filtration. Christian-Albrechts-Universität zu Kiel. Jan. 1, 2011. Dissertation.

(Continued)

*Primary Examiner* — T. Bennett Mckenzie

(74) *Attorney, Agent, or Firm* — Wolf, Greenfield & Sacks, P.C.

(57) ABSTRACT

Filter media comprising polyethersulfone, related components, and related methods are generally described.

21 Claims, 9 Drawing Sheets

100

110

(56) References Cited

U.S. PATENT DOCUMENTS

| | | | |
|---|---|---|---|
| 5,954,962 A * | 9/1999 | Adiletta | D06M 15/256 |
| | | | 428/338 |
| 6,171,684 B1 | 1/2001 | Kahlbaugh et al. | |
| 6,916,752 B2 | 7/2005 | Berrigan et al. | |
| 7,008,465 B2 | 3/2006 | Graham et al. | |
| 7,137,510 B1 | 11/2006 | Klein et al. | |
| 7,314,497 B2 | 1/2008 | Kahlbaugh et al. | |
| 8,268,224 B2 | 9/2012 | Kohinata et al. | |
| 8,689,985 B2 | 4/2014 | Bates, III et al. | |
| 9,457,325 B2 | 10/2016 | Choi et al. | |
| 9,694,556 B2 | 7/2017 | Turner et al. | |
| 2007/0207692 A1 * | 9/2007 | Ono | D21H 11/12 |
| | | | 162/1 |
| 2008/0257149 A1 * | 10/2008 | Ogale | A47L 9/14 |
| | | | 55/528 |
| 2010/0192531 A1 * | 8/2010 | Bao | B01D 39/1638 |
| | | | 55/497 |
| 2010/0288692 A1 * | 11/2010 | Kakzau | D04H 1/43838 |
| | | | 428/401 |
| 2012/0091072 A1 | 4/2012 | Kozlov et al. | |
| 2012/0318754 A1 | 12/2012 | Cox et al. | |
| 2013/0055900 A1 * | 3/2013 | Sauer | A47L 5/225 |
| | | | 96/135 |
| 2013/0108831 A1 | 5/2013 | Wu et al. | |
| 2014/0174934 A1 * | 6/2014 | Meier | B01D 39/2017 |
| | | | 55/486 |
| 2014/0346107 A1 * | 11/2014 | Anantharamaiah | |
| | | | B01D 39/2017 |
| | | | 55/528 |
| 2015/0298032 A1 * | 10/2015 | Tinkham | B01D 39/1623 |
| | | | 210/489 |
| 2016/0074787 A1 * | 3/2016 | Schmalz | B01D 39/1623 |
| | | | 210/488 |
| 2016/0175748 A1 | 6/2016 | Park | |
| 2016/0175754 A1 | 6/2016 | Morison et al. | |
| 2016/0288056 A1 | 10/2016 | Bergmann et al. | |
| 2016/0303498 A1 * | 10/2016 | Doucouré | B01D 39/2065 |
| 2017/0326486 A1 * | 11/2017 | Chu | B01D 67/0004 |
| 2017/0361254 A1 * | 12/2017 | Huang | D01D 10/00 |
| 2018/0001244 A1 * | 1/2018 | Zhu | B01D 46/0032 |
| 2018/0169551 A1 * | 6/2018 | Jaganathan | B01D 39/1623 |
| 2018/0185777 A1 * | 7/2018 | Rahmathullah | B01D 39/163 |
| 2018/0251925 A1 | 9/2018 | Knowlson et al. | |
| 2018/0290087 A1 * | 10/2018 | Higginson | B01D 39/1623 |
| 2019/0076768 A1 | 3/2019 | Goenka et al. | |
| 2019/0233591 A1 | 8/2019 | Taylor et al. | |
| 2020/0171418 A1 | 6/2020 | Rezaei et al. | |

FOREIGN PATENT DOCUMENTS

| | | | | |
|---|---|---|---|---|
| KR | 101479757 B1 * | 1/2015 | | |
| KR | 20150023960 A * | 3/2015 | | D04H 1/4291 |
| KR | 1020150023960 A * | 3/2015 | | |
| WO | WO 2017/032748 A1 | 3/2017 | | |
| WO | WO 2018/011347 A1 | 1/2018 | | |

OTHER PUBLICATIONS

Kwankhao. Microfiltration Membranes via Electrospinning of Polyethersulfone Solutions. Universität Duisburg-Essen. Nov. 12, 2013. Dissertation.

Nakata et al. Electrospinning of Poly (ether sulfone) and Evaluation of the Filtration Efficiency. Sen-I Gakkaishi. Oct. 2007;63(12);307-12.

PCT/US2021/042698 Nov. 10, 2021, International Search Report and Written Opinion.

International Search Report and Written Opinion for International Application No. PCT/US2021/042698 mailed Nov. 10, 2021.

*U.S. Appl. No. 15/484,497, filed Apr. 11, 2017, Higginson et al.

Yoon et al., Formation of functional polyethersulfone electrospun membrane for water purification by mixed solvent and oxidation processes. Polymer. Jun. 19, 2009;50(13):2593-9.

* cited by examiner

100

110

100

FILTER MEDIA COMPRISING A POLYETHERSULFONE-BASED FINE FIBER LAYER

TECHNICAL FIELD

Filter media comprising a polyethersulfone-based fine fiber layer, related components, and related methods are generally described.

BACKGROUND

Filter media are articles that can be used to remove contamination in a variety of applications. Some filter media include PES-based fine fiber layers comprising polyethersulfone (PES) material. However, these PES-based fine fiber layers comprising PES material may be made up of PES material with a high polydispersity index (PDI) and/or low intrinsic viscosity, resulting in high amounts of macro defects, low elongation at break, and/or low tensile strength. Accordingly, improved filter media and associated methods are needed.

SUMMARY

Filter media comprising a polyethersulfone-based fine fiber layer, related components, and related methods are generally described.

In some embodiments, the filter media comprises a PES-based fine fiber layer comprising a plurality of fine fibers comprising a polyethersulfone (PES) material; wherein the PES material has a polydispersity index of less than 2.6; and the PES material has an intrinsic viscosity of greater than 0.3 dL/g.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Disclosed herein are filter media comprising a polyethersulfone (PES)-based fine fiber layer, related components, and related methods. In some embodiments, the PES-based fine fiber layer comprises fine fibers comprising a PES material that has a low polydispersity index (PDI) (e.g., less than 2.6). In some embodiments, the PES material has a high intrinsic viscosity (e.g., greater than 0.3 dL/g). In some embodiments, the low PDI and/or the high intrinsic viscosity impart one or more advantages over PES material with higher PDI and/or lower intrinsic viscosity, all other factors being equal. Examples of such advantages of filter media comprising PES-based fine fiber layers (e.g., which are electrospun) comprising PES material having a low PDI and/or high intrinsic viscosity may include lower amounts of macro defects per square meter, improved mechanical properties (e.g., increased elongation at break and/or increased tensile strength), and/or increased efficiency.

Figure 1:
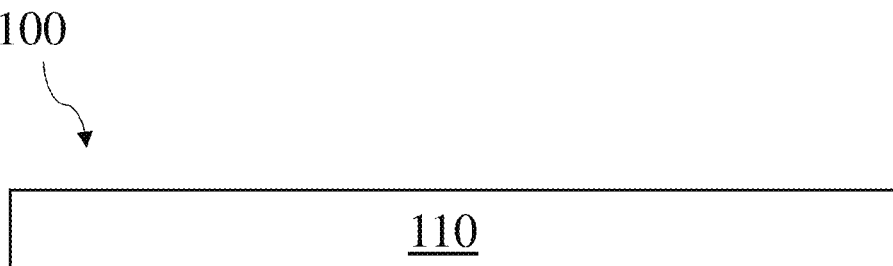
FIG. 1 is, in accordance with certain embodiments, a schematic of a filter media comprising a PES-based fine fiber layer.

FIG. 1 illustrates a filter media 100 that comprises a PES-based fine fiber layer 110. In some embodiments, the PES-based fine fiber layer comprises a PES material. In some embodiments, the PES material comprises a multi-block polymer or a co-block polymer. In some embodiments, the PES-based fine fiber layer may comprise a plurality of fine fibers. It should be understood that the fine fibers comprise a PES material. In some embodiments, the PES-based fine fiber layer comprises other types of fibers in addition to the fine fibers. The PES-based fine fiber layer may comprise more than one type of fine fiber. In embodiments where the PES-based fine fiber layer comprises more than one type of fine fiber, one or more of those fine fibers may be described by one or more embodiments described herein while one or more of the types of fine fibers may not be described by one or more embodiments described herein. In some embodiments, some (e.g., at least 20%, at least 40%, at least 60%, or at least 80%) or all of the fine fibers are produced by electrospinning, force spinning, and/or meltblown spinning.

The PES-based fine fiber layer may have any suitable amount of fine fibers. In some embodiments, the PES-based fine fiber layer has greater than or equal to 5 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, greater than or equal to 95 wt %, or greater than or equal to 99 wt % fine fibers relative to the total fiber weight of the PES-based fine fiber layer. In some embodiments, the PES-based fine fiber layer has less than or equal to 100 wt %, less than or equal to 99 wt %, less than or equal to 95 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt % fine fibers relative to the total fiber weight of the PES-based fine fiber layer. Combinations of these ranges are also possible (e.g., greater than or equal to 5 wt % and less than or equal to 100 wt %, greater than or equal to 10 wt % and less than or equal to 100 wt %, or greater than or equal to 80 wt % and less than or equal to 100 wt %). In some embodiments, the PES-based fine fiber layer has 100 wt % fine fibers relative to the total fiber weight of the PES-based fine fiber layer.

The PES-based fine fiber layer and/or fine fibers may have any suitable average fiber diameter. In some embodiments, the PES-based fine fiber layer and/or fine fibers have an average fiber diameter of greater than or equal to 10 nm, greater than or equal to 25 nm, greater than or equal to 50 nm, greater than or equal to 75 nm, greater than or equal to 100 nm, greater than or equal to 150 nm, greater than or equal to 200 nm, greater than or equal to 250 nm, greater than or equal to 300 nm, greater than or equal to 350 nm, greater than or equal to 400 nm, greater than or equal to 450 nm, greater than or equal to 500 nm, greater than or equal to 750 nm, greater than or equal to 1 micron, greater than or equal to 1.25 microns, greater than or equal to 1.5 microns, greater than or equal to 1.75 microns, greater than or equal to 2 microns, greater than or equal to 2.25 microns, greater than or equal to 2.5 microns, greater than or equal to 3 microns, greater than or equal to 4 microns, or greater than or equal to 5 microns. In some embodiments, the PES-based fine fiber layer and/or fine fibers have an average fiber diameter of less than or equal to 6 microns, less than or equal to 5 microns, less than or equal to 4 microns, less than or equal to 3 microns, less than or equal to 2.75 microns, less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, less than or equal to 750 nm, less than or equal to 500 nm, less than or equal to 450 nm, less than or equal to 400 nm, less than or equal to 350 nm, less than or equal to 300 nm, less than or equal to 250 nm, less than or equal to 200 nm, less than or equal to 150 nm, less than or equal to 100 nm, less than or equal to 75 nm, less than or equal to 50 nm, or less than or equal to 25 nm. Combinations of these ranges are also possible (e.g., greater than or equal to 10 nm and less than or equal to 6 microns, greater than or equal to 10 nm and less than or equal to 3 microns, greater than or equal to 100 nm and less than or equal to 400 nm, or greater than or equal to 100 nm and less than or equal to 300 nm). Fiber diameter may be measured using scanning electron microscopy.

The distribution of fiber diameter of the fine fibers may have any suitable standard deviation. In some embodiments, the distribution of fiber diameter of the fine fibers has a standard deviation of greater than or equal to 10 nm, greater than or equal to 20 nm, greater than or equal to 30 nm, greater than or equal to 40 nm, greater than or equal to 50 nm, greater than or equal to 60 nm, greater than or equal to 70 nm, greater than or equal to 80 nm, or greater than or equal to 90 nm. In some embodiments, the distribution of fiber diameter of the fine fibers has a standard deviation of less than or equal to 100 nm, less than or equal to 90 nm, less than or equal to 80 nm, less than or equal to 70 nm, less than or equal to 60 nm, less than or equal to 50 nm, less than or equal to 40 nm, less than or equal to 30 nm, less than or equal to 20 nm, or less than or equal to 15 nm. Combinations of these ranges are also possible (e.g., greater than or equal to 10 nm and less than or equal to 100 nm, greater than or equal to 20 nm and less than or equal to 90 nm, or greater than or equal to 30 nm and less than or equal to 70 nm). Fiber diameter distribution may be determined using scanning electron microscopy.

The PES-based fine fiber layer and/or fine fibers may have any suitable average fiber length per weight (i.e., average fiber length of the fibers divided by the average weight of the fibers). In some embodiments, the PES-based fine fiber layer and/or fine fibers have an average fiber length per weight of greater than or equal to $2\times10^{7}$ mm/g, greater than or equal to $2\times10^{8}$ mm/g, greater than or equal to $2\times10^{9}$ mm/g, greater than or equal to $1.21\times10^{10}$ mm/g, greater than or equal to $3\times10^{10}$ mm/g, greater than or equal to $5\times10^{10}$ mm/g, greater than or equal to $7\times10^{10}$ mm/g, greater than or equal to $9\times10^{10}$ mm/g, greater than or equal to $1\times10^{11}$ mm/g, greater than or equal to $2.8\times10^{11}$ mm/g, greater than or equal to $5.3\times10^{11}$ mm/g, greater than or equal to $7\times10^{11}$ mm/g, greater than or equal to $9\times10^{11}$ mm/g, or greater than or equal to $1\times10^{12}$ mm/g. In some embodiments, the PES-based fine fiber layer and/or fine fibers have an average fiber length per weight of less than or equal to $2.28\times10^{12}$ mm/g, less than or equal to $1\times10^{12}$ mm/g, less than or equal to $9\times10^{11}$ mm/g, less than or equal to $7.8\times10^{11}$ mm/g, less than or equal to $5\times10^{11}$ mm/g, less than or equal to $3\times10^{11}$ mm/g, less than or equal to $1\times10^{11}$ mm/g, less than or equal to $9\times10^{10}$ mm/g, less than or equal to $7\times10^{10}$ mm/g, less than or equal to $5\times10^{10}$ mm/g, less than or equal to $3\times10^{10}$ mm/g, less than or equal to $3\times10^{9}$ mm/g, or less than or equal to $3\times10^{8}$ mm/g. Combinations of these references are also possible (e.g., greater than or equal to $2\times10^{7}$ mm/g and less than or equal to $2.28\times10^{12}$ mm/g, greater than or equal to $1.21\times10^{10}$ mm/g and less than or equal to $2.28\times10^{12}$ mm/g, greater than or equal to $2.8\times10^{11}$ mm/g and less than or equal to $1\times10^{12}$ mm/g, or greater than or equal to $5.3\times10^{11}$ mm/g and less than or equal to $7.8\times10^{11}$ mm/g).

The PES material from which the fine fibers are formed may have any suitable polydispersity index (PDI). As noted above, in some embodiments, the PES material has a relatively low PDI. For example, in some embodiments, the PES material has a polydispersity index of less than 2.6, less than or equal to 2.5, less than or equal to 2.4, less than or equal to 2.3, less than or equal to 2.2, less than or equal to 2.1, or less than or equal to 2. In some embodiments, the PES material has a polydispersity index of greater than or equal to 1.9, greater than or equal to 2.0, greater than or equal to 2.1, greater than or equal to 2.2, or greater than or equal to 2.3. Combinations of these ranges are also possible (e.g., greater than or equal to 1.9 and less than 2.6 or greater than or equal to 2.1 and less than 2.6). PDI may be determined according to the following equation:

$$PDI = M_w/M_n$$

where $M_w$ is the mass average molecular weight and $M_n$ is the number average molecular weight and $M_w$ and $M_n$ may be calculated from parameters measured using gel permeation chromatography according to ASTM D 3536 (1991).

$M_w$ may be determined according to the following equations, or measured:

$$\overline{M_w} = \frac{\sum_{i=1}^{N} w_i M_i}{\sum_{i=1}^{N} w_i} = \frac{\sum_{i=1}^{N} N_i M_i^2}{\sum_{i=1}^{N} N_i M_i}$$

where $w_i$ is the total weight (mass) of polymer chains with a specific length or molecular weight, $M_i$ is the molecular weight of the individual polymer chain with a specific length or molecular weight, $N_i$ is the number of polymer chains having approximately the same specific length or molecular weight, and N is the number of unique specific lengths or molecular weights of polymer chains within a sample. $M_w$ may be used to determine the values of other variables (e.g., $w_i$ and $M_i$) from the same equation.

$M_n$ may be determined according to the following equation:

$$\overline{M_n} = \frac{\Sigma_{i=1}^{N} N_i M_i}{\Sigma_{i=1}^{N} N_i}$$

where $M_i$, $N_i$, and N are as described above.

In some embodiments, using fibers formed from PES material having a low PDI (such as the PDI described herein) has many advantages. In some embodiments, a layer comprising the fine fibers described herein may have a lower number of macro defects (described in additional detail below) than a layer comprising fibers formed from PES material with a higher PDI (all other factors being equal). In some embodiments, a layer comprising the fine fibers described herein may have a higher elongation at break than a layer comprising fibers formed from PES material with a higher PDI (all other factors being equal). In some embodiments, a layer comprising the fine fibers described herein may have a higher tensile strength than a layer comprising fibers formed from PES material with a higher PDI (all other factors being equal). In some embodiments, a layer comprising the fine fibers described herein may have a higher filtration efficiency than a layer comprising fibers formed from PES material with a higher PDI (all other factors being equal).

The PES material may have any suitable intrinsic viscosity. As noted above, in some embodiments, the PES material has a relatively high intrinsic viscosity. For example, in some embodiments, the PES material has an intrinsic viscosity of greater than or equal to 0.3 dL/g, greater than or equal to 0.35 dL/g, greater than or equal to 0.4 dL/g, greater than or equal to 0.45 dL/g, greater than or equal to 0.5 dL/g, greater than or equal to 0.6 dL/g, greater than or equal to 0.7 dL/g, greater than or equal to 0.8 dL/g, greater than or equal to 0.9 dL/g, greater than or equal to 1 dL/g, greater than or equal to 1.1 dL/g, greater than or equal to 1.2 dL/g, greater than or equal to 1.3 dL/g, greater than or equal to 1.4 dL/g, greater than or equal to 1.5 dL/g, greater than or equal to 1.6 dL/g, greater than or equal to 1.7 dL/g, greater than or equal to 1.8 dL/g, or greater than or equal to 1.9 dL/g. In some embodiments, the PES material has an intrinsic viscosity of less than or equal to 2 dL/g, less than or equal to 1.9 dL/g, less than or equal to 1.8 dL/g, less than or equal to 1.7 dL/g, less than or equal to 1.6 dL/g, less than or equal to 1.5 dL/g, less than or equal to 1.4 dL/g, less than or equal to 1.3 dL/g, less than or equal to 1.2 dL/g, less than or equal to 1.1 dL/g, less than or equal to 1 dL/g, less than or equal to 0.9 dL/g, less than or equal to 0.8 dL/g, or less than or equal to 0.7 dL/g. Combinations of these ranges are also possible (e.g., greater than or equal to 0.3 dL/g and less than or equal to 2 dL/g, greater than or equal to 0.4 dL/g and less than or equal to 2 dL/g, or greater than or equal to 0.5 dL/g and less than or equal to 1 dL/g).

Intrinsic viscosity (centipoise) may be determined using any suitable viscometer, such as a small sample adaptor Brookfield viscometer. As a skilled person would understand, the appropriate rotation speed of the viscometer depends on the viscosity of the sample. An appropriate rotation speed may be selected by starting at 12 RPM and gradually increasing the speed until a torque value between 10% and 90% is obtained. The appropriate rotation speed typically falls within the range of 12 RPM and 20 RPM. One suitable technique for measuring intrinsic viscosity involves first preparing multiple samples (e.g., 4 or more 100 g solutions) of the PES material at various concentrations (e.g., at various concentrations within the range of 20-28 wt % PES material) in dimethylacetamide. The viscosity of each of these samples ($\eta_{solution}$) may be obtained from the viscometer. These samples may be plotted, where the x axis is the concentration of PES material in each sample (in g PES/dL solvent) and the y axis is the specific viscosity of each sample (in dL/g). The exponential equation that best fits the tested samples may be determined, where the y-intercept of that exponential equation is the intrinsic viscosity of the PES material. The Y coordinates may be obtained by the following equation:

$$\eta_{sp} = \frac{\eta_{solution} - \eta_{solvent}}{\eta_{solvent}}$$

$$\eta_{intrinsic} = \lim_{\phi \to 0} \frac{\eta_{solution} - \eta_{solvent}}{\eta_{solvent} * \emptyset} =$$

$$\lim_{\phi \to 0} \frac{\eta_{sp}}{\emptyset} = \frac{cP(mPas) - cP(mPas)}{cP(mPas) * \frac{g}{dL}} = \text{The } Y \text{ coordinate (dL/g)}$$

where $\eta_{solvent}$ (centipoise) may be obtained from databases, and Ø is the weight of PES material divided by the weight of the solution.

The intrinsic viscosity of the PES material may be determined by plotting any suitable number of concentrations of the PES material. In some embodiments, the intrinsic viscosity of the PES material is determined by plotting greater than or equal to 4 concentrations, greater than or equal to 5 concentrations, greater than or equal to 6 concentrations, greater than or equal to 7 concentrations, greater than or equal to 8 concentrations, or greater than or equal to 9 concentrations of the PES material. In some embodiments, the intrinsic viscosity of the PES material is determined by plotting less than or equal to 15 concentrations, less than or equal to 12 concentrations, less than or equal to 10 concentrations, less than or equal to 8 concentrations, less than or equal to 6 concentrations, or less than or equal to 5 concentrations of the PES material. Combinations of these ranges are also possible (e.g., greater than or equal to 4 concentrations and less than or equal to 15 concentrations or greater than or equal to 4 concentrations and less than or equal to 6 concentrations).

The exponential equation for determining intrinsic viscosity may have any suitable $R^2$ value. In some embodiments, the exponential equation has an $R^2$ value of greater than or equal to 0.90, greater than or equal to 0.92, greater than or equal to 0.95, greater than or equal to 0.96, greater than or equal to 0.97, greater than or equal to 0.98, greater than or equal to 0.99, or greater than or equal to 0.999. In some embodiments, the exponential equation for determining intrinsic viscosity has an $R^2$ value of less than or equal to 1, less than or equal to 0.999, less than or equal to 0.99, less than or equal to 0.98, less than or equal to 0.97, less than or equal to 0.96, or less than or equal to 0.95. Combinations of these ranges are also possible (e.g., greater than or equal to 0.90 and less than or equal to 1, greater than or equal to 0.95 and less than or equal to 1, or greater than or equal to 0.99 and less than or equal to 1).

In some embodiments, having a higher intrinsic viscosity (such as the intrinsic viscosities described herein) has advantages. For example, in some embodiments, a layer comprising the fine fibers described herein may have a lower number of macro defects than a layer comprising fine fibers with a lower intrinsic viscosity (all other factors being equal). Without wishing to be bound by theory, it is believed that having lower intrinsic viscosity may be attributed to short polymer chains, which may contribute to defect formation, as short polymer chains can relax quicker than long polymer chains and they can end up forming spherical droplets and deposits on the nanoweb as shot or forming holes.

The PES material may have any suitable molecular weight. In some embodiments, the PES material has a molecular weight of greater than or equal to 21,000 g/mol, greater than or equal to 23,000 g/mol, greater than or equal to 25,000 g/mol, greater than or equal to 27,000 g/mol, greater than or equal to 29,000 g/mol, greater than or equal to 31,000 g/mol, greater than or equal to 33,000 g/mol, greater than or equal to 35,000 g/mol, greater than or equal to 37,000 g/mol, greater than or equal to 39,000 g/mol, greater than or equal to 41,000 g/mol, greater than or equal to 43,000 g/mol, greater than or equal to 50,000 g/mol, greater than or equal to 60,000 g/mol, greater than or equal to 70,000 g/mol, greater than or equal to 80,000 g/mol, or greater than or equal to 90,000 g/mol. In some embodiments, the PES material has a molecular weight of less than or equal to 100,000 g/mol, less than or equal to 90,000 g/mol, less than or equal to 80,000 g/mol, less than or equal to 70,000 g/mol, less than or equal to 60,000 g/mol, less than or equal to 50,000 g/mol, less than or equal to 43,000 g/mol, less than or equal to 41,000 g/mol, less than or equal to 39,000 g/mol, less than or equal to 37,000 g/mol, less than or equal to 35,000 g/mol, less than or equal to 33,000 g/mol, less than or equal to 31,000 g/mol, less than or equal to 29,000 g/mol, less than or equal to 27,000 g/mol, less than or equal to 25,000 g/mol, or less than or equal to 23,000 g/mol. Combinations of the above-referenced ranges are also possible (e.g., greater than or equal to 21,000 g/mol and less than or equal to 100,000 g/mol, greater than or equal to 27,000 g/mol and less than or equal to 43,000 g/mol, or greater than or equal to 31,000 g/mol and less than or equal to 39,000 g/mol). Molecular weight may be measured using gel permeation chromatography according to ASTM D5296 (2019).

The PES material may have any suitable glass transition temperature. In some embodiments, the PES material has a glass transition temperature of greater than or equal to 185° C., greater than or equal to 190° C., greater than or equal to 195° C., greater than or equal to 200° C., greater than or equal to 205° C., greater than or equal to 210° C., greater than or equal to 215° C., greater than or equal to 220° C., greater than or equal to 225° C., greater than or equal to 230° C., greater than or equal to 235° C., greater than or equal to 240° C., greater than or equal to 245° C., or greater than or equal to 250° C. In some embodiments, the PES material has a glass transition temperature of less than or equal to 255° C., less than or equal to 250° C., less than or equal to 245° C., less than or equal to 240° C., less than or equal to 235° C., less than or equal to 230° C., less than or equal to 225° C., less than or equal to 220° C., less than or equal to 215° C., less than or equal to 210° C., less than or equal to 205° C., less than or equal to 200° C., less than or equal to 195° C., or less than or equal to 190° C. Combinations of these ranges are also possible (e.g., greater than or equal to 185° C. and less than or equal to 255° C., greater than or equal to 200° C. and less than or equal to 240° C., or greater than or equal to 215° C. and less than or equal to 225° C.). Glass transition temperature may be measured using differential scanning calorimetry, heating from 20° C. to 400° C. at a rate of 5° C./minute.

In some embodiments, additives may be added during manufacture of the fine fibers. Non-limiting examples of suitable additives include cationic surfactants, anionic surfactants, non-ionic surfactants, ammonium salts (e.g., tetra ethylene ammonium bromide (TEAB)), sulfonium salts, organic salts, inorganic salts, esters, ethers, and/or polymers (e.g., polymers derived from monomers such as 1-vinylpyr-rolid-2-one, N-alkyl-methacrylamide, vinyl acetate, 1-vi-nylimidazole, 1-vinyl[alkyl]imidazole, 1-vinyl-2-pyridine, 1-vinyl-4-pyridine, acrylamide, N-vinylformamide, and N-[alkyl]formamide). In some embodiments, the PES-based fine fiber layer and/or the PES material comprises the additive (e.g., TEAB).

In embodiments where the PES-based fine fiber layer comprises an additive, the PES-based fine fiber layer may have any suitable amount of the additive (e.g., TEAB). In some embodiments, the PES-based fine fiber layer comprises greater than or equal to 0.05 wt %, greater than or equal to 0.1 wt %, greater than or equal to 0.15 wt %, greater than or equal to 0.2 wt %, greater than or equal to 0.25 wt %, greater than or equal to 0.3 wt %, greater than or equal to 0.35 wt %, greater than or equal to 0.4 wt %, or greater than or equal to 0.45 wt % of the additive (e.g., TEAB). In some embodiments, the PES-based fine fiber layer comprises less than or equal to 5 wt %, less than or equal to 4.5 wt %, less than or equal to 4 wt %, less than or equal to 3.5 wt %, less than or equal to 3 wt %, less than or equal to 2.5 wt %, less than or equal to 2 wt %, less than or equal to 1.5 wt %, less than or equal to 1 wt %, or less than or equal to 0.5 wt % of the additive (e.g., TEAB). Combinations of these ranges are also possible (e.g., greater than or equal to 0.05 wt % and less than or equal to 5 wt %).

In some embodiments, the PES-based fine fiber layer (and/or fine fibers) comprises anti-static PES material (e.g., any PES material described herein). In some embodiments, the anti-static PES material comprises an additive (e.g., any additive described herein, a charged additive, or a catalyst). In some embodiments, the PES-based fine fiber layer (and/or fine fibers) has reduced static (e.g., at least 10%, at least 25%, or at least 50% reduced; less than or equal to 100% or less than or equal to 50% reduced; combinations of these ranges are also possible) compared to a PES-based fine fiber layer (and/or fine fibers) without, or with lower amounts (e.g., at least 10 wt. %, at least 25 wt. %, or at least 50 wt. % lower; less than or equal to 100 wt. % or less than or equal to 50 wt. % lower; combinations are also possible) of the anti-static PES material all other factors being equal). In some embodiments, the amount of static may be determined visually by shredding paper, placing samples of the same size over the same amount of shredded paper, and visually determining how much paper clings to each sample. In some embodiments, static may attract dust during formation of the fine fibers and/or PES-based fine fiber layer leading to lower filtration performance and/or shorter filter media life. Without wishing to be bound by theory, it is believed that the anti-static PES material has reduced static due to use of charged additives or a catalyst.

The PES-based fine fiber layer may have a low number of macro defects. As used herein, macro defects are defects (e.g., holes and/or shot) having a dimension of greater than 10 microns. In some embodiments, the PES-based fine fiber layer has less than or equal to 1,790 macro defects/square meter, less than or equal to 1,600 macro defects/square meter, less than or equal to 1,400 macro defects/square meter, less than or equal to 1,200 macro defects/square meter, less than or equal to 1,000 macro defects/square meter, less than or equal to 900 macro defects/square meter, less than or equal to 700 macro defects/square meter, less than or equal to 500 macro defects/square meter, less than or equal to 358 macro defects/square meter, less than or equal to 300 macro defects/square meter, less than or equal to 200 macro defects/square meter, less than or equal to 150 macro defects/square meter, less than or equal to 107 macro defects/square meter, less than or equal to 75 macro defects/square meter, less than or equal to 50 macro defects/square meter, less than or equal to 40 macro defects/square meter, less than or equal to 30 macro defects/square meter, less than or equal to 20 macro defects/square meter, less than or equal to 15 macro defects/square meter, less than or equal to 10 macro defects/square meter, less than or equal to 6 macro defects/square meter, or less than or equal to 3 macro defects/square meter. In some embodiments, the PES-based fine fiber layer has greater than or equal to 0 macro defects/square meter or greater than or equal to 1 macro defect/square meter. Combinations of these ranges are also possible (e.g., greater than or equal to 0 macro defects/square meter and less than or equal to 1,790 macro defects/square meter, greater than or equal to 0 macro defects/square meter and less than or equal to 358 macro defects/square meter, or greater than or equal to 0 macro defects/square meter and less than or equal to 107 macro defects/square meter). In some embodiments, the PES-based fine fiber layer has 0 macro defects/square meter. The number of macro defects/square meter may be determined visually. For example, the PES-based fine fiber layer may be placed on a light box such that any macro defects can be visualized more easily (e.g., via optical microscopy). In some embodiments, reduced macro defects results in improved filtration efficiency and/or improved mechanical properties (e.g., increased elongation at break and/or tensile strength), such that it can be pleated in post-treatment.

The PES-based fine fiber layer may have any suitable elongation at break. In some embodiments, the PES-based fine fiber layer has an elongation at break of greater than or equal to 2%, greater than or equal to 3%, greater than or equal to 4%, greater than or equal to 5%, greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, greater than or equal to 75%, greater than or equal to 80%, or greater than or equal to 90%. In some embodiments, the PES-based fine fiber layer has an elonga-tion at break of less than or equal 100%, less than or equal 90%, less than or equal to 80%, less than or equal to 75%, less than or equal to 70%, less than or equal to 65%, less than or equal to 60%, less than or equal to 50%, less than or equal to 45%, less than or equal to 40%, less than or equal to 35%, less than or equal to 33%, less than or equal to 30%, less than or equal to 25%, less than or equal to 20%, less than or equal to 15%, less than or equal to 10%, or less than or equal to 5%. Combinations of these ranges are also possible (e.g., greater than or equal to 2% and less than or equal to 100%, greater than or equal to 2% and less than or equal to 80%, greater than or equal to 3% and less than or equal to 33%, or greater than or equal to 3% and less than or equal to 25%). Elongation at break may be measured according to ASTM D 5034 (2009). In some embodiments, the elongation at break of the PES-based fine fiber layer described herein is greater than the elongation at break of a PES-based fine fiber layer comprising PES material with a higher PDI (all other factors being equal).

The PES-based fine fiber layer may have any suitable tensile strength. In some embodiments, the PES-based fine fiber layer has a tensile strength of greater than or equal to 0.1 MPa, greater than or equal to 0.15 MPa, greater than or equal to 0.2 MPa, greater than or equal to 0.25 MPa, greater than or equal to 0.3 MPa, greater than or equal to 0.35 MPa, greater than or equal to 0.4 MPa, greater than or equal to 0.5 MPa, greater than or equal to 1 MPa, greater than or equal to 2 MPa, greater than or equal to 3 MPa, or greater than or equal to 4 MPa. In some embodiments, the PES-based fine fiber layer has a tensile strength of less than or equal to 5 MPa, less than or equal to 4 MPa, less than or equal to 3 MPa, less than or equal to 2 MPa, less than or equal to 1 MPa, less than or equal to 0.5 MPa, less than or equal to 0.4 MPa, less than or equal to 0.35 MPa, less than or equal to 0.3 MPa, less than or equal to 0.25 MPa, less than or equal to 0.2 MPa, or less than or equal to 0.15 MPa. Combinations of these ranges are also possible (e.g., greater than or equal to 0.1 MPa and less than or equal to 5 MPa, greater than or equal to 0.1 MPa and less than or equal to 3 MPa, or greater than or equal to 0.1 MPa and less than or equal to 0.4 MPa). Tensile strength may be measured according to ASTM D 5034 (2009).

The PES-based fine fiber layer may have any suitable thickness. In some embodiments, the PES-based fine fiber layer has a thickness of greater than or equal to 100 nm, greater than or equal to 300 nm, greater than or equal to 500 nm, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, greater than or equal to 55 microns, greater than or equal to 60 microns, greater than or equal to 70 microns, greater than or equal to 80 microns, greater than or equal to 90 microns, greater than or equal to 100 microns, greater than or equal to 125 microns, greater than or equal to 150 microns, greater than or equal to 175 microns, greater than or equal to 200 microns, greater than or equal to 225 microns, or greater than or equal to 250 microns. In some embodiments, the PES-based fine fiber layer has a thickness of less than or equal to 300 microns, less than or equal to 275 microns, less than or equal to 250 microns, less than or equal to 225 microns, less than or equal to 200 microns, less than or equal to 175 microns, less than or equal to 150 microns, less than or equal to 125 microns, less than or equal to 100 microns, less than or equal to 95 microns, less than or equal to 90 microns, less than or equal to 85 microns, less than or equal to 80 microns, less than or equal to 75 microns, less than or equal to 70 microns, less than or equal to 65 microns, less than or equal to 60 microns, less than or equal to 55 microns, less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, or less than or equal to 2 microns. Combinations of these ranges are also possible (e.g., greater than or equal to 100 nm and less than or equal to 300 microns, greater than or equal to 1 micron and less than or equal to 300 microns, greater than or equal to 1 micron and less than or equal to 100 microns, greater than or equal to 2 microns and less than or equal to 80 microns, or greater than or equal to 4 microns and less than or equal to 60 microns). The thickness may be determined by measuring the average cross-sectional dimension (e.g., at 5 locations) using Scanning Electron Microscopy.

The PES-based fine fiber layer may have any suitable basis weight. In some embodiments, the PES-based fine fiber layer has a basis weight of greater than or equal to 0.1 gsm, greater than or equal to 0.5 gsm, greater than or equal to 1 gsm, greater than or equal to 2 gsm, greater than or equal to 3 gsm, greater than or equal to 4 gsm, greater than or equal to 5 gsm, greater than or equal to 7 gsm, greater than or equal to 9 gsm, greater than or equal to 10 gsm, greater than or equal to 12 gsm, greater than or equal to 14 gsm, greater than or equal to 16 gsm, greater than or equal to 18 gsm, greater than or equal to 20 gsm, greater than or equal to 25 gsm, greater than or equal to 30 gsm, greater than or equal to 35 gsm, greater than or equal to 40 gsm, greater than or equal to 45 gsm, greater than or equal to 50 gsm, or greater than or equal to 55 gsm. In some embodiments, the PES-based fine fiber layer has a basis weight of less than or equal to 60 gsm, less than or equal to 55 gsm, less than or equal to 50 gsm, less than or equal to 45 gsm, less than or equal to 40 gsm, less than or equal to 35 gsm, less than or equal to 30 gsm, less than or equal to 25 gsm, less than or equal to 20 gsm, less than or equal to 18 gsm, less than or equal to 16 gsm, less than or equal to 14 gsm, less than or equal to 12 gsm, less than or equal to 10 gsm, less than or equal to 9 gsm, less than or equal to 7 gsm, less than or equal to 5 gsm, less than or equal to 4 gsm, or less than or equal to 3 gsm. Combinations of these ranges are also possible (e.g., greater than or equal to 0.1 gsm and less than or equal to 60 gsm, greater than or equal to 2 gsm and less than or equal to 60 gsm, greater than or equal to 2 gsm and less than or equal to 40 gsm, greater than or equal to 4 gsm and less than or equal to 30 gsm, or greater than or equal to 7 gsm and less than or equal to 20 gsm). Basis weight may be measured according to TAPPI 410 (2013), where gsm is grams per square meter.

The PES-based fine fiber layer may have any suitable mean flow pore size. In some embodiments, the PES-based fine fiber layer has a mean flow pore size of greater than or equal to 100 nm, greater than or equal to 110 nm, greater than or equal to 120 nm, greater than or equal to 130 nm, greater than or equal to 140 nm, greater than or equal to 150 nm, greater than or equal to 160 nm, greater than or equal to 170 nm, greater than or equal to 180 nm, greater than or equal to 190 nm, greater than or equal to 200 nm, greater than or equal to 300 nm, greater than or equal to 400 nm, greater than or equal to 500 nm, greater than or equal to 600 nm, greater than or equal to 700 nm, greater than or equal to 800 nm, greater than or equal to 900 nm, greater than or equal to 1 micron, greater than or equal to 1.25 microns, greater than or equal to 1.5 microns, greater than or equal to 2 microns, greater than or equal to 2.25 microns, greater than or equal to 2.5 microns, greater than or equal to 3 microns, greater than or equal to 4 microns, greater than or equal to 5 microns, greater than or equal to 6 microns, greater than or equal to 7 microns, greater than or equal to 8 microns, or greater than or equal to 9 microns. In some embodiments, the PES-based fine fiber layer has a mean flow pore size of less than or equal to 15 microns, less than or equal to 12 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2.5 microns, less than or equal to 2.25 microns, less than or equal to 2 microns, less than or equal to 1.5 microns, less than or equal to 1.25 microns, less than or equal to 1 micron, less than or equal to 900 nm, less than or equal to 800 nm, less than or equal to 700 nm, less than or equal to 600 nm, less than or equal to 500 nm, less than or equal to 400 nm, less than or equal to 300 nm, less than or equal to 200 nm, less than or equal to 190 nm, less than or equal to 180 nm, less than or equal to 170 nm, less than or equal to 160 nm, or less than or equal to 150 nm. Combinations of these ranges are also possible (e.g., greater than or equal to 100 nm and less than or equal to 15 microns, greater than or equal to 100 nm and less than or equal to 10 microns, greater than or equal to 150 nm and less than or equal to 10 microns, greater than or equal to 150 nm and less than or equal to 2.5 microns, or greater than or equal to 150 nm and less than or equal to 800 nm). Mean flow pore size may be measured using a Capillary Flow Porometer manufactured by Porous Materials, Inc. in accordance with the ASTM F316 (2003) standard at 15 PSI.

The PES-based fine fiber layer may have any suitable maximum pore size. In some embodiments, the PES-based fine fiber layer has a maximum pore size of greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 1.25 microns, greater than or equal to 1.5 microns, greater than or equal to 1.75 microns, greater than or equal to 2 microns, greater than or equal to 2.5 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 20 microns, greater than or equal to 25 microns, or greater than or equal to 30 microns. In some embodiments, the PES-based fine fiber layer has a maximum pore size of less than or equal to 35 microns, less than or equal to 30 microns, less than or equal to 25 microns, less than or equal to 20 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2.5 microns, less than or equal to 2 microns, less than or equal to 1.75 microns, less than or equal to 1.5 microns, less than or equal to 1.25 microns, less than or equal to 1 micron, less than or equal to 0.9 microns, less than or equal to 0.8 microns, or less than or equal to 0.6 microns. Combinations of these ranges are also possible (e.g., greater than or equal to 0.1 microns and less than or equal to 35 microns, greater than or equal to 0.15 microns and less than or equal to 15 microns, or greater than or equal to 0.5 microns and less than or equal to 7 microns). Maximum pore size may be measured according to ASTM F316 (2003) at 15 PSI.

The PES-based fine fiber layer may have any suitable ratio of maximum pore size to mean flow pore size. In some embodiments, the PES-based fine fiber layer has a ratio of maximum pore size to mean flow pore size of greater than or equal to 1:1, greater than or equal to 2:1, greater than or equal to 3:1, greater than or equal to 4:1, greater than or equal to 5:1, greater than or equal to 6:1, greater than or equal to 7:1, greater than or equal to 8:1, greater than or equal to 9:1, greater than or equal to 10:1, greater than or equal to 11:1, greater than or equal to 12:1, greater than or equal to 13:1, or greater than or equal to 14:1. In some embodiments, the PES-based fine fiber layer has a ratio of maximum pore size to mean flow pore size of less than or equal to 15:1, less than or equal to 14:1, less than or equal to 13:1, less than or equal to 12:1, less than or equal to 11:1, less than or equal to 10:1, less than or equal to 9:1, less than or equal to 8:1, less than or equal to 7:1, less than or equal to 6:1, less than or equal to 5:1, less than or equal to 4:1, less than or equal to 3:1, or less than or equal to 2:1. Combinations of these ranges are also possible (e.g., greater than or equal to 1:1 and less than or equal to 15:1 or greater than or equal to 1:1 and less than or equal to 6:1).

The PES-based fine fiber layer may have any suitable air permeability. In some embodiments, the PES-based fine fiber layer has an air permeability of greater than or equal to 0.5 CFM, greater than or equal to 1 CFM, greater than or equal to 2 CFM, greater than or equal to 3 CFM, greater than or equal to 4 CFM, greater than or equal to 5 CFM, greater than or equal to 10 CFM, greater than or equal to 20 CFM, greater than or equal to 30 CFM, greater than or equal to 40 CFM, greater than or equal to 50 CFM, greater than or equal to 75 CFM, greater than or equal to 100 CFM, greater than or equal to 150 CFM, greater than or equal to 200 CFM, greater than or equal to 250 CFM, greater than or equal to 300 CFM, or greater than or equal to 400 CFM. In some embodiments, the PES-based fine fiber layer has an air permeability of less than or equal to 500 CFM, less than or equal to 450 CFM, less than or equal to 400 CFM, less than or equal to 350 CFM, less than or equal to 300 CFM, less than or equal to 250 CFM, less than or equal to 200 CFM, less than or equal to 150 CFM, less than or equal to 100 CFM, less than or equal to 75 CFM, less than or equal to 50 CFM, less than or equal to 40 CFM, less than or equal to 30 CFM, less than or equal to 20 CFM, less than or equal to 10 CFM, or less than or equal to 5 CFM. Combinations of these ranges are also possible (e.g., greater than or equal to 0.5 CFM and less than or equal to 500 CFM, greater than or equal to 2 CFM and less than or equal to 300 CFM, or greater than or equal to 30 CFM and less than or equal to 300 CFM). Air permeability may be measured according to ASTM D737-04 (2016) at a pressure of 125 Pa and at 10" water (ca. 2488 Pas).

The PES-based fine fiber layer may have any suitable surface area. In some embodiments, the PES-based fine fiber layer has a surface area of greater than or equal to 4 $m^2/g$, greater than or equal to 6 $m^2/g$, greater than or equal to 8 $m^2/g$, greater than or equal to 10 $m^2/g$, greater than or equal to 12 $m^2/g$, greater than or equal to 14 $m^2/g$, greater than or equal to 16 $m^2/g$, greater than or equal to 18 $m^2/g$, greater than or equal to 20 $m^2/g$, greater than or equal to 25 $m^2/g$, greater than or equal to 30 $m^2/g$, greater than or equal to 35 $m^2/g$, greater than or equal to 40 $m^2/g$, greater than or equal to 50 $m^2/g$, greater than or equal to 60 $m^2/g$, greater than or equal to 70 $m^2/g$, greater than or equal to 80 $m^2/g$, or greater than or equal to 90 $m^2/g$. In some embodiments, the PES-based fine fiber layer has a surface area of less than or equal to 100 $m^2/g$, less than or equal to 90 $m^2/g$, less than or equal to 80 $m^2/g$, less than or equal to 70 $m^2/g$, less than or equal to 60 $m^2/g$, less than or equal to 50 $m^2/g$, less than or equal to 40 $m^2/g$, less than or equal to 35 $m^2/g$, less than or equal to 30 $m^2/g$, less than or equal to 25 $m^2/g$, less than or equal to 20 $m^2/g$, less than or equal to 18 $m^2/g$, less than or equal to 16 $m^2/g$, less than or equal to 14 $m^2/g$, less than or equal to 12 $m^2/g$, or less than or equal to 10 $m^2/g$. Combinations of these ranges are also possible (e.g., greater than or equal to 4 $m^2/g$ and less than or equal to 100 $m^2/g$, greater than or equal to 12 $m^2/g$ and less than or equal to 70 $m^2/g$, or greater than or equal to 20 $m^2/g$ and less than or equal to 40 $m^2/g$). As used herein, the surface area refers to the BET surface area, which is measured through use of a standard BET surface area measurement technique. The BET surface area is measured according to section 10 of Battery Council International Standard BCIS-03A, "Recommended Battery Materials Specifications Valve Regulated Recombinant Batteries," section 10 being "Standard Test Method for Surface Area of Recombinant Battery Separator Mat." Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in, e.g., a ¾" tube; and, the sample is allowed to degas at 75 degrees C. for a minimum of 3 hours.

The PES-based fine fiber layer may have any suitable dust holding capacity. In some embodiments, the PES-based fine fiber layer has a dust holding capacity of greater than or equal to 2 gsm, greater than or equal to 3 gsm, greater than or equal to 4 gsm, greater than or equal to 5 gsm, greater than or equal to 10 gsm, greater than or equal to 20 gsm, greater than or equal to 30 gsm, greater than or equal to 40 gsm, greater than or equal to 50 gsm, greater than or equal to 60 gsm, greater than or equal to 70 gsm, greater than or equal to 80 gsm, greater than or equal to 90 gsm, greater than or equal to 100 gsm, greater than or equal to 125 gsm, greater than or equal to 150 gsm, greater than or equal to 200 gsm, or greater than or equal to 250 gsm. In some embodiments, the PES-based fine fiber layer has a dust holding capacity of less than or equal to 300 gsm, less than or equal to 250 gsm, less than or equal to 200 gsm, less than or equal to 150 gsm, less than or equal to 125 gsm, less than or equal to 100 gsm, less than or equal to 90 gsm, less than or equal to 80 gsm, less than or equal to 70 gsm, less than or equal to 60 gsm, less than or equal to 50 gsm, less than or equal to 40 gsm, less than or equal to 30 gsm, less than or equal to 20 gsm, or less than or equal to 10 gsm. Combinations of these ranges are also possible (e.g., greater than or equal to 2 gsm and less than or equal to 300 gsm, greater than or equal to 3 gsm and less than or equal to 200 gsm, or greater than or equal to 5 gsm and less than or equal to 100 gsm). Dust holding capacity may be measured according to EN-13443-2 (2007) using clay particles with a median size of 1 micron at 1 mg/L in water, at a 15 L/min flow rate and a temperature of 23° C. (±2° C.), until the pressure drop reaches 2 bars.

The PES-based fine fiber layer may have any suitable initial efficiency. In some embodiments, the PES-based fine fiber layer has an initial efficiency of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, greater than or equal to 99.5%, greater than or equal to 99.9%, or greater than or equal to 99.99%. In some embodiments, the PES-based fine fiber layer has an initial efficiency of less than 100%, less than or equal to 99.99%, less than or equal to 99.9%, less than or equal to 99.5%, less than or equal to 99%, less than or equal to 98%, less than or equal to 95%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of these ranges are also possible (e.g., greater than or equal to 5% and less than 100%). In some embodiments, these initial efficiencies may be achieved with a particle size of 4 microns or 10 microns. The initial efficiency may be measured according to ISO 19438 (2013).

As referred to herein, the ISO 19438 (2013) testing uses ISO12103-A1 Fine grade test dust at a base upstream gravimetric dust level (BUGL) of 50 mg/liter. The test fluid is Aviation Hydraulic Fluid AERO HFA MIL H-5606A manufactured by Mobil. The test is run at a face velocity of 0.06 cm/s until a terminal pressure of 100 kPa. The average efficiency is the average of the efficiency values measured at one minute intervals until the terminal pressure is reached. The protocol for measuring initial efficiency refers to the average efficiency measurements of the media at 4, 5, and 6 minutes after running the test.

The PES-based fine fiber layer may have any suitable average efficiency. In some embodiments, the PES-based fine fiber layer has an average efficiency measured according to ISO 19438 (2013) (e.g., for fuel) (e.g., with 4 micron or 10 micron particles), ISO 16889 (2008) (e.g., for fuel) (e.g., with 4 micron or 10 micron particles), ISO 4548 (2012) (e.g., for oil filtration) (e.g., for 20 micron or 30 micron particles), SAEJ1488 (2010) (e.g., for fuel water separation), or EN-13443-2 (2007) of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, greater than or equal to 99.5%, greater than or equal to 99.9%, or greater than or equal to 99.99%. In some embodiments, the PES-based fine fiber layer has an average efficiency measured according to ISO 19438 (2013) (e.g., for fuel) (e.g., with 4 micron or 10 micron particles), ISO 16889 (2008) (e.g., for fuel) (e.g., with 4 micron or 10 micron particles), ISO 4548 (2012) (e.g., for oil filtration) (e.g., for 20 micron or 30 micron particles), SAEJ1488 (2010) (e.g., for fuel water separation), or EN-13443-2 (2007) of less than 100%, less than or equal to 99.99%, less than or equal to 99.9%, less than or equal to 99.5%, less than or equal to 99%, less than or equal to 98%, less than or equal to 95%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of these ranges are also possible (e.g., greater than or equal to 5% and less than 100%).

As used herein, ISO 16889 testing refers to ISO 16889 testing modified by testing a flat sheet sample, e.g., using a Multipass Filter Test Stand manufactured by FTI. The testing uses ISO 12103-1 A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test can be run at a face velocity of 0.67 cm/s until a terminal pressure of 500 kPa. Particle counts (particles per milliliter) at the particle sized selected (e.g., 1, 1.5, 2, 3, 4, 5, 7, 10, 15, 20, 25, or 30 microns) upstream and downstream of the media can be taken at ten points equally divided over the time of the test. The average of upstream and downstream particle counts can be taken at each selected particle size.

As used herein, ISO 4548-12 (2000) testing uses ISO 12103-1 A3 Medium test dust manufactured by PTI, Inc. at an upstream gravimetric dust level of 10 mg/liter. The test fluid is Aviation Hydraulic Fluid AERO HFA MIL H-5606A manufactured by Mobil. The test can be run at a face velocity of 0.26 cm/s until a terminal differential pressure of 172 kPa. Particle counts (particles per milliliter) at the particle sized selected (e.g., 1, 1.5, 2, 3, 4, 5, 7, 10, 15, 20, 25, or 30 microns) upstream and downstream of the media can be taken at ten points equally divided over the time of the test. The average of upstream and downstream particle counts can be taken at each selected particle size. As used herein, SAEJ1488 (2010) testing involves sending a sample of fuel (ultra-low sulfur diesel fuel) with controlled water content (2500 ppm) through a pump across the media at a face velocity of 0.069 cm/sec. The water is emulsified into fine droplets and sent to challenge the media. The water is coalesced, shed, or both coalesced and shed, and collects at the bottom of a sample holder. The water content of the sample is measured both upstream and downstream of the media, via Karl Fischer titration. The fuel-water separation efficiency is the amount of water removed from the fuel-water mixture, and is equivalent to $(1-C/2500)*100\%$, where C is the downstream concentration of water. The average efficiency is the average of the efficiencies measured during a 150 minute test. The first measurement of the sample upstream and downstream of the media is taken at 10 minutes from the start of the test. Then, measurement of the sample downstream of the media is taken every 20 minutes until 150 minutes have elapsed from the beginning of the test.

As used herein, EN-13443-2 (2007) efficiency testing measures a diluted feed stream over a 2-hour period, using a blend of latex particles having 4 different mean particle diameters (0.2 micron, 0.4 micron, 0.6 micron, and 0.8 micron) dispersed in clean water, with a particle count concentration of 2,200 counts/ml, at a 15 L/min flow rate and a temperature of 23° C. (±2° C.). Four evenly spaced upstream measurements and four evenly spaced downstream measurements are taken, and the average is determined.

Figure 2:
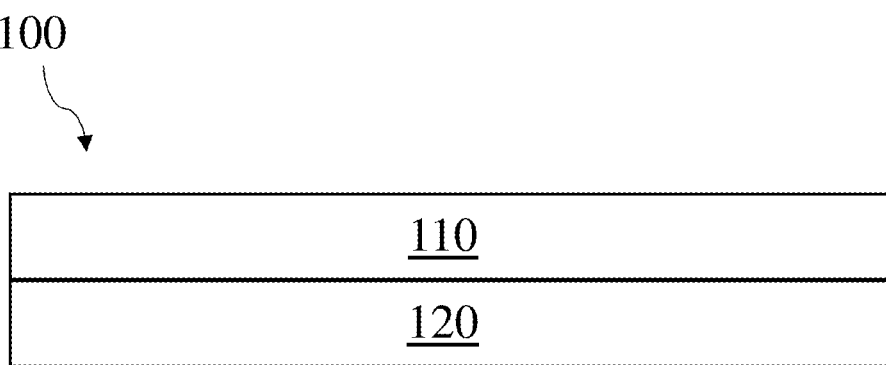
FIG. 2 is, in accordance with certain embodiments, a schematic of a filter media comprising a PES-based fine fiber layer and a second layer.
Figure 3:
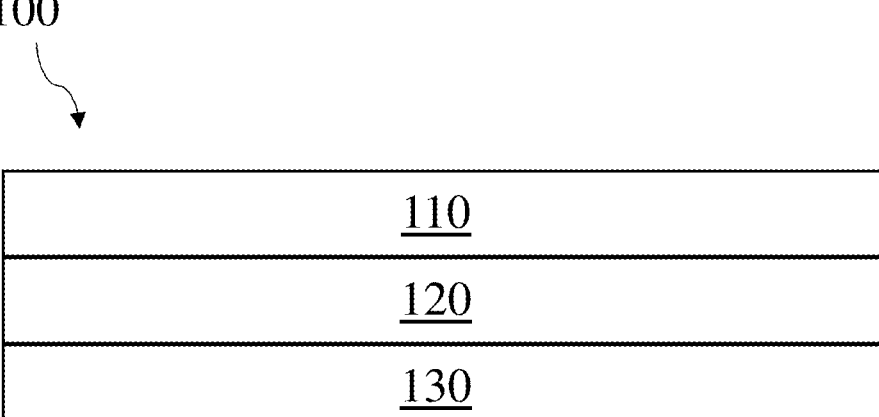
FIG. 3 is, in accordance with certain embodiments, a schematic of a filter media comprising a PES-based fine fiber layer, a second layer, and a third layer.
Figure 4A:
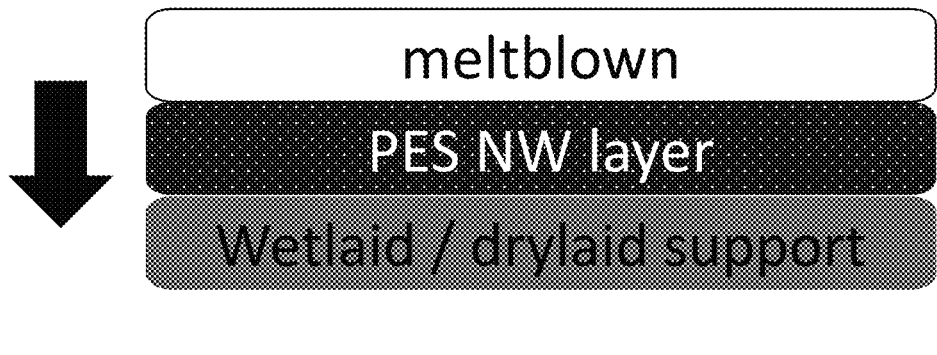
FIG. 4A, FIG. 4B, FIG. 4C, FIG. 4D, FIG. 4E, and FIG. 4F each show non-limiting examples of designs suitable for fuel filters, in accordance with some embodiments.
Figure 4B:
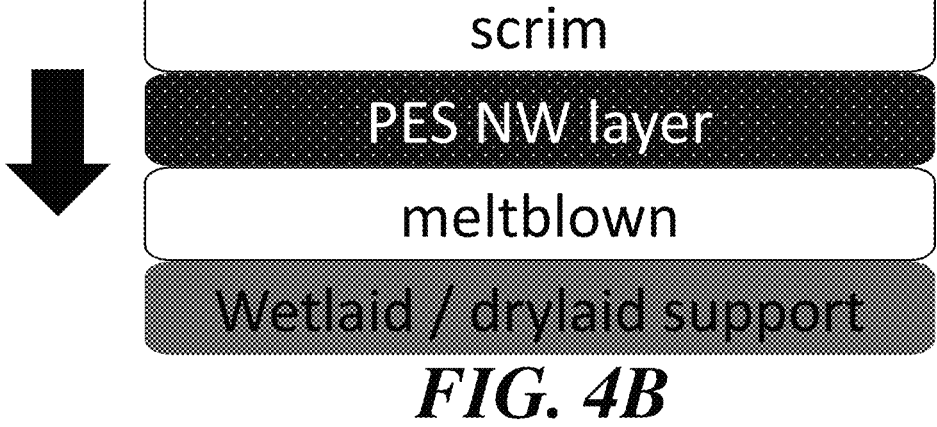
Figure 4C:
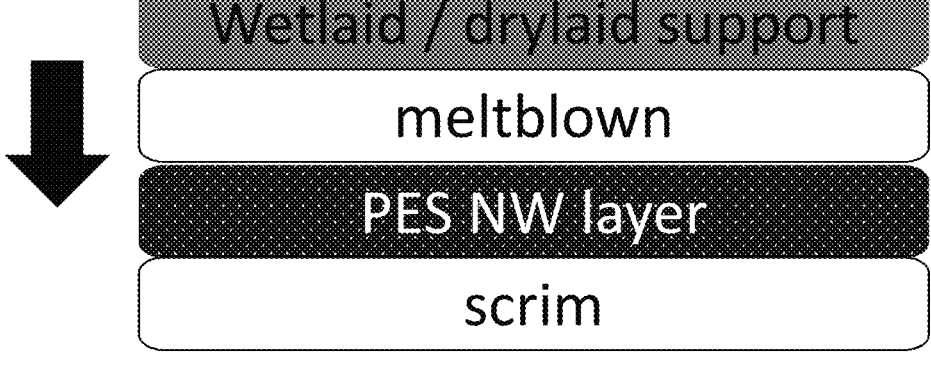
Figure 4D:
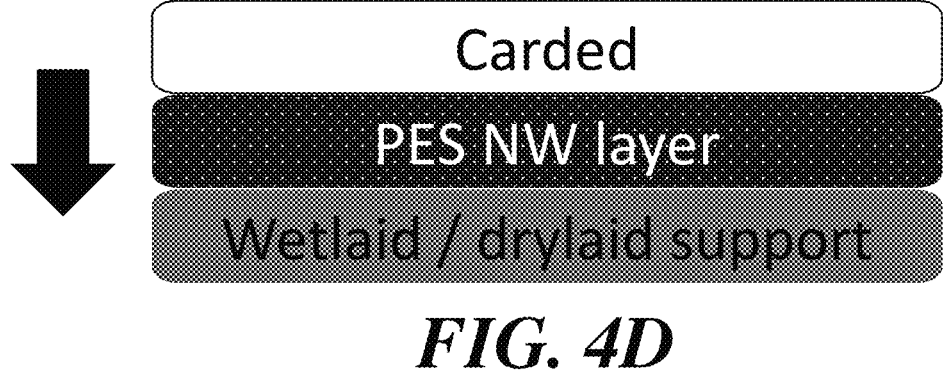
Figure 4E:
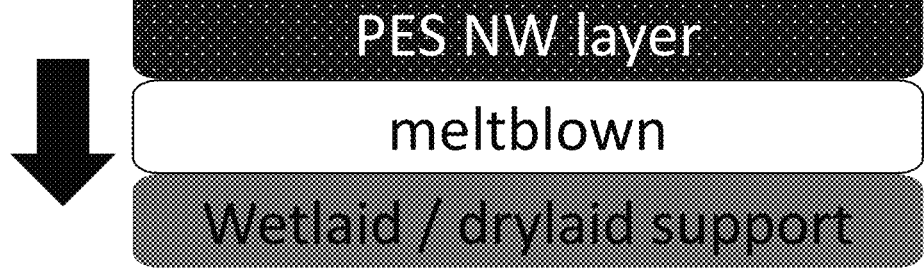
Figure 4F:
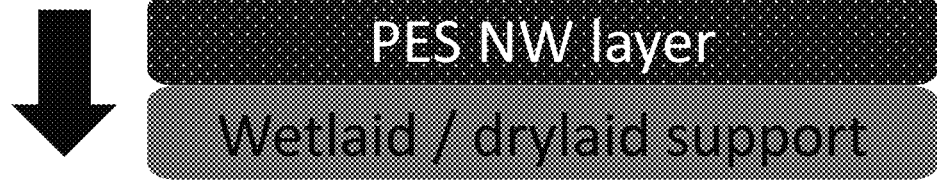
Figures 5A, 5B, 5C, 5D:
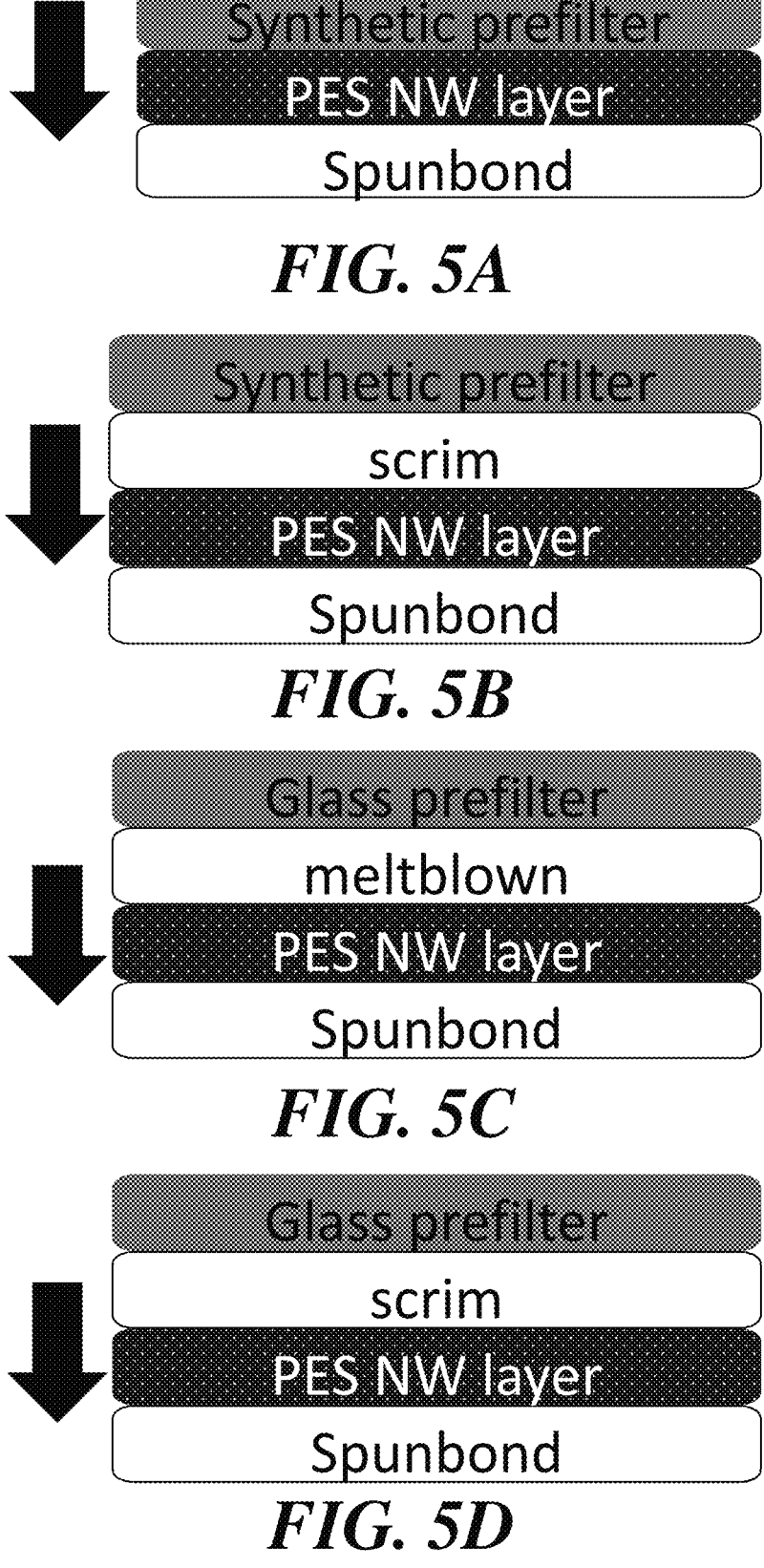
FIG. 5A, FIG. 5B, FIG. 5C, and FIG. 5D each show non-limiting examples of designs suitable for hydraulic fluid filters, in accordance with some embodiments.

In some embodiments, the filter media comprises the PES-based fine fiber layer and one or more additional layers. For example, in some embodiments, filter media 100 in FIG. 2 comprises PES-based fine fiber layer 110 and second layer 120. Similarly, in some embodiments, filter media 100 in FIG. 3 comprises PES-based fine fiber layer 110, second layer 120, and third layer 130.

The filter media may have any suitable number of layers. In some embodiments, the filter media comprises greater than or equal to 1 layer, greater than or equal to 2 layers, greater than or equal to 3 layers, greater than or equal to 4 layers, greater than or equal to 5 layers, greater than or equal to 6 layers, greater than or equal to 7 layers, greater than or equal to 8 layers, or greater than or equal to 9 layers. In some embodiments, the filter media comprises less than or equal to 10 layers, less than or equal to 9 layers, less than or equal to 8 layers, less than or equal to 7 layers, less than or equal to 6 layers, less than or equal to 5 layers, less than or equal to 4 layers, or less than or equal to 3 layers. Combinations of these ranges are also possible (e.g., greater than or equal to 1 layer and less than or equal to 10 layers, greater than or equal to 2 layers and less than or equal to 7 layers, greater than or equal to 2 layers and less than or equal to 5 layers, or greater than or equal to 2 layers and less than or equal to 3 layers).

In some embodiments, the additional layer(s) is a prefilter layer, a protective layer, an efficiency layer, and/or a support layer. In some embodiments, the additional layer(s) is wet-laid. That is, the additional layer(s) are formed by a wetlaid process. In some embodiments, the additional layer(s) is non-wetlaid. That is, in some embodiments the additional layer(s) may be formed by a non-wetlaid process (e.g., an air laid process, a carding process, a meltblown process, and/or a spinning process (e.g., a spunbond process)). In some embodiments, the additional layer(s) is calendered and/or paste-dotted (i.e., adhesive is applied in a dot pattern to adhere fibers within a layer). In some embodiments, the additional layer(s) is downstream of the PES-based fine fiber layer. In some embodiments, the additional layer(s) is upstream of the PES-based fine fiber layer.

In some embodiments, the additional layer(s) and the PES-based fine fiber layer are in contact with one another. In some embodiments, the additional layer(s) and the PES-based fine fiber layer are physically bonded together (e.g., using thermal compression). In some embodiments, the additional layer(s) (e.g., support layer) is adhered to the PES-based fine fiber layer by lamination and/or with glue.

In some embodiments, the additional layer(s) (e.g., support layer) is non-fibrous. For example, the additional layer(s) may comprise a plastic film, a membrane (e.g., plastic membrane), and/or metallic foil. Examples of suitable membranes include cellulose acetate membrane; regenerated cellulose membrane; hydrophobic PTFE membrane; polyamide membrane; polycarbonate membrane; polyethersulfone membrane; ceramic membranes made from inorganic materials such as alumina, titania, zirconia oxides, silicon carbide or glassy materials; metallic membrane made from metals, such as Pd, Ag, Fe, Ni, steel, and their alloys; or combinations thereof.

In some embodiments, the additional layer(s) (e.g., support layer) comprises fibers, such as natural fibers, cellulose-derivative fibers, synthetic fibers (e.g., the fine fibers disclosed herein or continuous fibers), and/or glass fibers.

Examples of natural fibers include cellulose. Other natural fibers are also possible. Examples of cellulose fibers include softwood fibers, hardwood fibers, a mixture of hardwood and softwood fibers, sheeted fibers, flash dried fibers, and mechanical pulp fibers (e.g., groundwood, chemically treated mechanical pulps, and thermomechanical pulps). Exemplary softwood fibers include fibers obtained from mercerized southern pine (e.g., mercerized southern pine fibers or "HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). Exemplary hardwood fibers include fibers obtained from *Eucalyptus* ("*Eucalyptus* fibers").

Examples of cellulose derivative fibers include Lyocell fibers and rayon fibers.

Examples of glass fibers include microglass fibers, chopped strand glass fibers, or a combination thereof. One skilled in the art is able to determine whether a glass fiber is chopped strand or microglass by observation (e.g., optical microscopy, electron microscopy). Chopped strand glass may also have chemical differences from microglass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers. Microglass fibers are drawn from bushing tips and further subjected to flame blowing or rotary spinning processes. In some cases, fine microglass fibers may be made using a remelting process. In this respect, microglass fibers may be fine or coarse. Chopped strand glass fibers are produced in a more controlled manner than microglass fibers, and as a result, chopped strand glass fibers will generally have less variation in fiber diameter and length than microglass fibers.

Examples of synthetic fibers include fibers comprising one or more of the following materials: poly(olefin)s (e.g., poly(propylene)), poly(ester)s (e.g., poly(butylene terephthalate), poly(ethylene terephthalate)), Nylons, poly(aramid)s, poly(vinyl alcohol), poly(ether sulfone), poly(acrylic)s (e.g., poly(acrylonitrile)), fluorinated polymers (e.g., poly(vinylidene difluoride)), and cellulose acetate. Examples of fine fibers include fine fibers comprising any features (or combinations of features) for fine fibers described herein. Examples of synthetic fibers include those formed from a meltblown process, melt spinning process, centrifugal spinning process, and/or electrospinning process. In some embodiments, the synthetic fibers may be staple fibers that are cut to length. In some instances, the synthetic fibers may be continuous fibers (e.g., meltblown fibers and/or spunbond fibers).

Continuous fibers are made by a "continuous" fiber-forming process, such as a meltblown, a meltspun, a melt electrospinning, a solvent electrospinning, a centrifugal spinning, or a spunbond process, and typically have longer lengths than non-continuous fibers. In certain embodiments, the continuous fibers described herein have an average length of greater than 5 inches. Non-continuous fibers may be cut to be (e.g., from a filament), may be formed to be, or may naturally be non-continuous discrete fibers having a particular length or a range of lengths as described in more detail herein. A non-limiting example of a non-continuous fiber is a staple fiber.

In embodiments where the additional layer(s) (e.g., support layer) comprises synthetic fibers (e.g., the fine fibers described herein, polyester fibers, nylon fibers, and/or poly(butylene terephthalate) fibers), the additional layer(s) may comprise any suitable amount of synthetic fibers. In some embodiments, the additional layer(s) comprises greater than or equal to 5 wt %, greater than or equal to 10 wt %, greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % synthetic fibers relative to the total weight of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, or less than or equal to 10 wt % synthetic fibers relative to the total weight of the additional layer(s). In some embodiments, the additional layer(s) comprises 100 wt % synthetic fibers relative to the total weight of the additional layer(s). Combinations of these ranges are also possible (e.g., greater than or equal to 5 wt % and less than or equal to 100 wt %, greater than or equal to 10 wt % and less than or equal to 100 wt %, or greater than or equal to 20 wt % and less than or equal to 100 wt %). In embodiments in which a filter media comprises two or more additional layers, each additional layer may independently have an amount of synthetic fibers in one or more of the ranges described above.

The synthetic fibers may have any suitable average fiber diameter. In some embodiments, the synthetic fibers have an average fiber diameter of greater than or equal to 0.5 microns, greater than or equal to 1 micron, greater than or equal to 1.5 microns, greater than or equal to 2.5 microns, greater than or equal to 5 microns, greater than or equal to 10 microns, greater than or equal to 15 microns, greater than or equal to 20 microns, or greater than or equal to 25 microns. In some embodiments, the synthetic fibers have an average fiber diameter of less than or equal to 30 microns, less than or equal to 25 microns, less than or equal to 24 microns, less than or equal to 20 microns, less than or equal to 19 microns, less than or equal to 15 microns, less than or equal to 10 microns, less than or equal to 5 microns, less than or equal to 2.5 microns, less than or equal to 1.5 microns, or less than or equal to 1 micron. Combination of these ranges are also possible (e.g., greater than or equal to 0.5 microns and less than or equal to 30 microns, greater than or equal to 1 micron and less than or equal to 24 microns, or greater than or equal to 1.5 microns and less than or equal to 19 microns).

The synthetic fibers may have any suitable average fiber length. In some embodiments, the synthetic fibers have an average fiber length of greater than or equal to 0.01 mm, greater than or equal to 0.05 mm, greater than or equal to 0.1 mm, greater than or equal to 1 mm, greater than or equal to 5 mm, greater than or equal to 10 mm, greater than or equal to 15 mm, greater than or equal to 20 mm. In some embodiments, the synthetic fibers have an average fiber length of less than or equal to 25 mm, less than or equal to 10 mm, less than or equal to 5 mm, or less than or equal to 1 mm. Combinations of these ranges are also possible (e.g., greater than or equal to 0.01 mm and less than or equal to 25 mm, greater than or equal to 0.05 mm and less than or equal to 25 mm, or greater than or equal to 1 mm and less than or equal to 25 mm).

As descried above, in some embodiments, the synthetic fibers comprise continuous fibers. In certain embodiments, the continuous synthetic fibers described herein have an average length of greater than 5 inches.

In embodiments where the additional layer(s) comprises meltblown fibers, the meltblown fibers may have any suitable average fiber diameter. In some embodiments, the meltblown fibers have an average fiber diameter of greater than or equal to 0.25 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, or greater than or equal to 15 microns. In some embodiments, the meltblown fibers have an average fiber diameter of less than or equal to 20 microns, less than or equal to 15 microns, less than or equal to 10 microns, less than or equal to 5 microns, less than or equal to 4 microns, less than or equal to 3 microns, less than or equal to 2 microns, less than or equal to 1 micron, or less than or equal to 0.5 microns. Combinations of these ranges are also possible (e.g., greater than or equal to 0.25 microns and less than or equal to 20 microns).

In embodiments where the additional layer(s) comprises spunbond fibers, the spunbond fibers may have any suitable average fiber diameter. In some embodiments, the spunbond fibers have an average fiber diameter of greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the spunbond fibers have an average fiber diameter of less than or equal to 50 microns, less than or equal to 45 microns, less than or equal to 40 microns, less than or equal to 35 microns, less than or equal to 30 microns, less than or equal to 25 microns, less than or equal to 20 microns, or less than or equal to 15 microns. Combinations of these ranges are also possible (e.g., greater than or equal to 10 microns and less than or equal to 50 microns).

In embodiments where the additional layer(s) (e.g., support layer) comprises microglass fibers, the additional layer(s) may comprise any suitable amount of microglass fibers. In some embodiments, the additional layer(s) comprises greater than or equal to 5 wt %, greater than or equal to 10 wt %, greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % microglass fibers relative to the total weight of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, or less than or equal to 10 wt % microglass fibers relative to the total weight of the additional layer(s). In some embodiments, the additional layer(s) comprises 100 wt % microglass fibers relative to the total weight of the additional layer(s). Combinations of these ranges are also possible (e.g., greater than or equal to 5 wt % and less than or equal to 100 wt %, greater than or equal to 10 wt % and less than or equal to 100 wt %, or greater than or equal to 20 wt % and less than or equal to 100 wt %). In embodiments in which a filter media comprises two or more additional layers, each additional layer may independently have an amount of microglass fibers in one or more of the ranges described above.

The microglass fibers may have any suitable average diameter. In some embodiments, the average diameter of the microglass fibers is greater than or equal to 0.2 microns, greater than or equal to 0.25 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, or greater than or equal to 0.9 microns. In some embodiments, the average diameter of the microglass fibers is less than or equal to 1 micron, less than or equal to 0.95 microns, less than or equal to 0.9 microns, less than or equal to 0.85 microns, less than or equal to 0.8 microns, less than or equal to 0.75 microns, less than or equal to 0.7 microns, less than or equal to 0.65 microns, less than or equal to 0.6 microns, less than or equal to 0.5 microns, less than or equal to 0.4 microns, or less than or equal to 0.3 microns. Combinations of these ranges are also possible (e.g., greater than or equal to 0.2 microns and less than or equal to 1 micron, greater than or equal to 0.2 microns and less than or equal to 0.8 microns, or greater than or equal to 0.2 microns and less than or equal to 0.6 microns).

The microglass fibers may have any suitable average length. In some embodiments, the average length of the microglass fibers is greater than or equal to 0.075 millimeters, greater than or equal to 0.1 millimeters, greater than or equal to 0.2 millimeters, greater than or equal to 0.3 millimeters, greater than or equal to 0.4 millimeters, greater than or equal to 0.5 millimeters, greater than or equal to 0.6 millimeters, greater than or equal to 0.7 millimeters, greater than or equal to 0.8 millimeters, greater than or equal to 0.9 millimeters, greater than or equal to 1 millimeter, greater than or equal to 1.25 millimeters, greater than or equal to 1.5 millimeters, greater than or equal to 1.75 millimeters, or greater than or equal to 2 millimeters. In some embodiments, the average length of the microglass fibers is less than or equal to 3 millimeters, less than or equal to 2.75 millimeters, less than or equal to 2.5 millimeters, less than or equal to 2.25 millimeters, less than or equal to 2 millimeters, less than or equal to 1.75 millimeters, less than or equal to 1.5 millimeters, less than or equal to 1.25 millimeters, less than or equal to 1 millimeter, less than or equal to 0.9 millimeters, less than or equal to 0.8 millimeters, less than or equal to 0.7 millimeters, less than or equal to 0.6 millimeters, less than or equal to 0.5 millimeters, less than or equal to 0.4 millimeters, or less than or equal to 0.3 millimeters. Combinations of these ranges are also possible (e.g., greater than or equal to 0.075 millimeters and less than or equal to 3 millimeters, greater than or equal to 0.5 millimeters and less than or equal to 2 millimeters, or greater than or equal to 0.5 millimeters and less than or equal to 1.5 millimeters).

In embodiments where the additional layer(s) (e.g., support layer) comprises chopped strand fibers, the additional layer(s) may comprise any suitable amount of chopped strand fibers. In some embodiments, the additional layer(s) comprises greater than or equal to 5 wt %, greater than or equal to 10 wt %, greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % chopped strand fibers relative to the total weight of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, or less than or equal to 10 wt % chopped strand fibers relative to the total weight of the additional layer(s). In some embodiments, the additional layer(s) comprises 100 wt % chopped strand fibers relative to the total weight of the additional layer(s). Combinations of these ranges are also possible (e.g., greater than or equal to 5 wt % and less than or equal to 100 wt %, greater than or equal to 10 wt % and less than or equal to 100 wt %, or greater than or equal to 20 wt % and less than or equal to 100 wt %). In embodiments in which a filter media comprises two or more additional layers, each additional layer may independently have an amount of chopped strand glass fibers in one or more of the ranges described above.

The chopped strand glass fibers may have any suitable average diameter. In some embodiments, the average diameter of the chopped strand glass fibers is greater than or equal to 5 microns, greater than or equal to 6 microns, greater than or equal to 7 microns, greater than or equal to 8 microns, greater than or equal to 9 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the average diameter of the chopped strand glass fibers is less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 9 microns, less than or equal to 8 microns, less than or equal to 7 microns, or less than or equal to 6 microns. Combinations of these ranges are also possible (e.g., greater than or equal to 5 microns and less than or equal to 50 microns, greater than or equal to 5 microns and less than or equal to 20 microns, or greater than or equal to 5 microns and less than or equal to 10 microns).

The chopped strand glass fibers may have any suitable average length. In some embodiments, the average length of the chopped strand glass fibers is greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, greater than or equal to 12 millimeters, greater than or equal to 14 millimeters, greater than or equal to 16 millimeters, or greater than or equal to 18 millimeters. In some embodiments, the average length of the chopped strand glass fibers is less than or equal to 20 millimeters, less than or equal to 18 millimeters, less than or equal to 16 millimeters, less than or equal to 14 millimeters, less than or equal to 12 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, or less than or equal to 4 millimeters. Combinations of these ranges are also possible (e.g., greater than or equal to 3 millimeters and less than or equal to 20 millimeters or greater than or equal to 6 millimeters and less than or equal to 12 millimeters).

In some embodiments, the additional layer(s) comprises a combination of chopped strand glass fibers and microglass fibers. In some such embodiments, the amount of chopped strand glass fibers and the amount of microglass fibers in the additional layer(s) are each within the ranges described herein for chopped strand glass fibers and microglass fibers, respectively. In some embodiments, the additional layer(s) comprises 100 wt. % glass fibers relative to the total weight of the additional layer(s), wherein the glass fibers comprise a combination of chopped strand glass fibers and microglass fibers.

In embodiments where the additional layer(s) comprises natural fibers, the additional layer(s) may comprise any suitable amount of the natural fibers. In some embodiments, the additional layer(s) comprises greater than or equal to 5 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % natural fibers relative to the total fiber content of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt % natural fibers relative to the total fiber content of the additional layer(s). In some embodiments, the additional layer(s) comprises 100 wt % natural fibers relative to the total fiber content of the additional layer. Combinations of these ranges are also possible (e.g., greater than or equal to 5 wt % and less than or equal to 100 wt %, greater than or equal to 10 wt % and less than or equal to 100 wt %, or greater than or equal to 10 wt % and less than or equal to 100 wt %). In embodiments in which a filter media comprises two or more additional layers, each additional layer may independently have an amount of natural fibers in one or more of the ranges described above.

The natural fibers may have any suitable average fiber diameter. In some embodiments, the natural fibers have an average fiber diameter of greater than or equal to 500 nm, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, greater than or equal to 100 microns, greater than or equal to 125 microns, greater than or equal to 150 microns, greater than or equal to 175 microns, greater than or equal to 200 microns, greater than or equal to 225 microns, greater than or equal to 250 microns, greater than or equal to 275 microns, greater than or equal to 300 microns, or greater than or equal to 350 microns. In some embodiments, the natural fibers have an average fiber diameter of less than or equal to 400 microns, less than or equal to 350 microns, less than or equal to 300 microns, less than or equal to 275 microns, less than or equal to 250 microns, less than or equal to 225 microns, less than or equal to 200 microns, less than or equal to 175 microns, less than or equal to 150 microns, less than or equal to 125 microns, less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 500 nm and less than or equal to 400 microns).

The natural fibers may have any suitable average fiber length. In some embodiments, the natural fibers have an average fiber length of greater than or equal to 0.01 mm, greater than or equal to 0.05 mm, greater than or equal to 0.1 mm, greater than or equal to 1 mm, greater than or equal to 5 mm, greater than or equal to 10 mm, greater than or equal to 15 mm, or greater than or equal to 20 mm. In some embodiments, the natural fibers have an average fiber length of less than or equal to 25 mm, less than or equal to 10 mm, less than or equal to 5 mm, or less than or equal to 1 mm.

Combinations of these ranges are also possible (e.g., greater than or equal to 0.01 mm and less than or equal to 25 mm, greater than or equal to 0.05 mm and less than or equal to 25 mm, or greater than or equal to 1 mm and less than or equal to 25 mm).

In embodiments where the additional layer(s) (e.g., support layer) comprises cellulose fibers, the additional layer(s) may comprise any suitable amount of cellulose fibers. In some embodiments, the additional layer(s) comprises greater than or equal to 5 wt %, greater than or equal to 10 wt %, greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose fibers relative to the total weight of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, or less than or equal to 10 wt % cellulose fibers relative to the total weight of the additional layer(s). In some embodiments, the additional layer(s) comprises 100 wt % cellulose fibers relative to the total weight of the additional layer(s). Combinations of these ranges are also possible (e.g., greater than or equal to 5 wt % and less than or equal to 100 wt %, greater than or equal to 10 wt % and less than or equal to 100 wt %, or greater than or equal to 20 wt % and less than or equal to 100 wt %). In embodiments in which a filter media comprises two or more additional layers, each additional layer may independently have an amount of cellulose fibers in one or more of the ranges described above.

The cellulose fibers may have any suitable average fiber diameter. In some embodiments, the cellulose fibers have an average fiber diameter of greater than or equal to 1 micron, greater than or equal to 2 microns, greater than or equal to 3 microns, greater than or equal to 4 microns, greater than or equal to 5 microns, greater than or equal to 6 microns, greater than or equal to 6.8 microns, greater than or equal to 7 microns, greater than or equal to 8 microns, greater than or equal to 9 microns, greater than or equal to 10 microns, greater than or equal to 15 microns, greater than or equal to 20 microns, or greater than or equal to 25 microns. In some embodiments, the cellulose fibers have an average fiber diameter of less than or equal to 30 microns, less than or equal to 25 microns, less than or equal to 24.2 microns, less than or equal to 20 microns, less than or equal to 18 microns, less than or equal to 15 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, or less than or equal to 2 microns. Combinations of these ranges are also possible (e.g., greater than or equal to 1 micron and less than or equal to 30 microns, greater than or equal to 6.8 microns and less than or equal to 24.2 microns, or greater than or equal to 5 microns and less than or equal to 18 microns).

The cellulose fibers may have any suitable average fiber length. In some embodiments, the cellulose fibers have an average fiber length of greater than or equal to 0.01 mm, greater than or equal to 0.05 mm, greater than or equal to 0.1 mm, greater than or equal to 1 mm, greater than or equal to 5 mm, greater than or equal to 10 mm, greater than or equal to 15 mm, or greater than or equal to 20 mm. In some embodiments, the cellulose fibers have an average fiber length of less than or equal to 25 mm, less than or equal to 10 mm, less than or equal to 5 mm, or less than or equal to 1 mm. Combinations of these ranges are also possible (e.g., greater than or equal to 0.01 mm and less than or equal to 25 mm, greater than or equal to 0.05 mm and less than or equal to 25 mm, or greater than or equal to 1 mm and less than or equal to 25 mm).

In embodiments where the additional layer(s) comprises cellulose-derivative fibers, the additional layer(s) may comprise any suitable amount of the cellulose-derivative fibers. In some embodiments, the additional layer(s) comprises greater than or equal to 5 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose-derivative fibers relative to the total fiber content of the additional layer(s). In some embodiments, the additional layer(s) comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt % cellulose-derivative fibers relative to the total fiber content of the additional layer(s). In some embodiments, the additional layer(s) comprises 100 wt % cellulose-derivative fibers relative to the total fiber content of the additional layer(s). Combinations of these ranges are also possible (e.g., greater than or equal to 5 wt % and less than or equal to 100 wt %, greater than or equal to 10 wt % and less than or equal to 100 wt %, or greater than or equal to 10 wt % and less than or equal to 100 wt %). In embodiments in which a filter media comprises two or more additional layers, each additional layer may independently have an amount of cellulose-derivative fibers in one or more of the ranges described above.

The cellulose-derivative fibers may have any suitable average fiber diameter. In some embodiments, the cellulose-derivative fibers have an average fiber diameter of greater than or equal to 10 nm, greater than or equal to 50 nm, greater than or equal to 100 nm, greater than or equal to 250 nm, greater than or equal to 500 nm, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, greater than or equal to 100 microns, greater than or equal to 125 microns, greater than or equal to 150 microns, greater than or equal to 175 microns, greater than or equal to 200 microns, greater than or equal to 225 microns, greater than or equal to 250 microns, greater than or equal to 275 microns, greater than or equal to 300 microns, or greater than or equal to 350 microns. In some embodiments, the cellulose-derivative fibers have an average fiber diameter of less than or equal to 400 microns, less than or equal to 350 microns, less than or equal to 300 microns, less than or equal to 275 microns, less than or equal to 250 microns, less than or equal to 225 microns, less than or equal to 200 microns, less than or equal to 175 microns, less than or equal to 150 microns, less than or equal to 125 microns, less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, less than or equal to 10 microns, less than or equal to 5 microns, less than or equal to 4 microns, less than or equal to 3 microns, less than or equal to 2 microns, less than or equal to 1 micron, less than or equal to 500 nm, less than or equal to 250 nm, or less than or equal to 100 nm. Combinations of these ranges are also possible (e.g., greater than or equal to 10 nm and less than or equal to 400 microns).

The cellulose-derivative fibers may have any suitable average fiber length. In some embodiments, the cellulose-derivative fibers have an average fiber length of greater than or equal to 0.01 mm, greater than or equal to 0.05 mm, greater than or equal to 0.1 mm, greater than or equal to 1 mm, greater than or equal to 5 mm, greater than or equal to 10 mm, greater than or equal to 15 mm, or greater than or equal to 20 mm. In some embodiments, the cellulose-derivative fibers have an average fiber length of less than or equal to 25 mm, less than or equal to 10 mm, less than or equal to 5 mm, or less than or equal to 1 mm. Combinations of these ranges are also possible (e.g., greater than or equal to 0.01 mm and less than or equal to 25 mm, greater than or equal to 0.05 mm and less than or equal to 25 mm, or greater than or equal to 1 mm and less than or equal to 25 mm).

Regardless of the type of fibers, the additional layer(s) may have any suitable average fiber diameter. In some embodiments, the additional layer(s) has an average fiber diameter of greater than or equal to 250 nm, greater than or equal to 500 nm, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, greater than or equal to 100 microns, greater than or equal to 125 microns, greater than or equal to 150 microns, greater than or equal to 175 microns, greater than or equal to 200 microns, greater than or equal to 225 microns, greater than or equal to 250 microns, greater than or equal to 275 microns, greater than or equal to 300 microns, or greater than or equal to 350 microns. In some embodiments, the additional layer(s) has an average fiber diameter of less than or equal to 400 microns, less than or equal to 350 microns, less than or equal to 300 microns, less than or equal to 275 microns, less than or equal to 250 microns, less than or equal to 225 microns, less than or equal to 200 microns, less than or equal to 175 microns, less than or equal to 150 microns, less than or equal to 125 microns, less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, less than or equal to 10 microns, less than or equal to 5 microns, less than or equal to 4 microns, less than or equal to 3 microns, less than or equal to 2 microns, less than or equal to 1 micron, or less than or equal to 500 nm. Combinations of these ranges are also possible (e.g., greater than or equal to 250 nm and less than or equal to 400 microns, greater than or equal to 5 microns and less than or equal to 300 microns, greater than or equal to 10 microns and less than or equal to 200 microns, or greater than or equal to 10 microns and less than or equal to 50 microns). In embodiments in which a filter media comprises two or more additional layers, each additional layer may independently have an average fiber diameter in one or more of the ranges described above.

Regardless of the type of fibers, the additional layer(s) may have any suitable average fiber length. In some embodiments, the additional layer(s) has an average fiber length of greater than or equal to 0.01 mm, greater than or equal to 0.05 mm, greater than or equal to 0.1 mm, greater than or equal to 1 mm, greater than or equal to 5 mm, greater than or equal to 10 mm, greater than or equal to 15 mm, or greater than or equal to 20 mm. In some embodiments, the additional layer(s) has an average fiber length of less than or equal to 25 mm, less than or equal to 10 mm, less than or equal to 5 mm, or less than or equal to 1 mm. Combinations of these ranges are also possible (e.g., greater than or equal to 0.01 mm and less than or equal to 25 mm, greater than or equal to 0.05 mm and less than or equal to 25 mm, or greater than or equal to 1 mm and less than or equal to 25 mm). In some embodiments, the additional layer(s) comprises continuous fibers, and, in certain instances, the continuous fibers may have an average fiber length of greater than 5 inches. In embodiments in which a filter media comprises two or more additional layers, each additional layer may independently have an average fiber length in one or more of the ranges described above.

The additional layer(s) (e.g., support layer) may have any suitable basis weight. In some embodiments, the additional layer(s) has a basis weight of greater than or equal to 5 gsm, greater than or equal to 10 gsm, greater than or equal to 25 gsm, greater than or equal to 40 gsm, greater than or equal to 45 gsm, greater than or equal to 50 gsm, greater than or equal to 55 gsm, greater than or equal to 60 gsm, greater than or equal to 65 gsm, greater than or equal to 70 gsm, greater than or equal to 75 gsm, greater than or equal to 80 gsm, greater than or equal to 85 gsm, greater than or equal to 90 gsm, greater than or equal to 95 gsm, greater than or equal to 100 gsm, greater than or equal to 150 gsm, greater than or equal to 200 gsm, greater than or equal to 300 gsm, or greater than or equal to 400 gsm. In some embodiments, the additional layer(s) has a basis weight of less than or equal to 500 gsm, less than or equal to 400 gsm, less than or equal to 300 gsm, less than or equal to 200 gsm, less than or equal to 150 gsm, less than or equal to 100 gsm, less than or equal to 95 gsm, less than or equal to 90 gsm, less than or equal to 85 gsm, less than or equal to 80 gsm, less than or equal to 75 gsm, less than or equal to 70 gsm, less than or equal to 65 gsm, less than or equal to 60 gsm, less than or equal to 55 gsm, less than or equal to 50 gsm, or less than or equal to 45 gsm. Combinations of these ranges are also possible (e.g., greater than or equal to 5 gsm and less than or equal to 500 gsm, greater than or equal to 5 gsm and less than or equal to 200 gsm, greater than or equal to 40 gsm and less than or equal to 100 gsm, greater than or equal to 10 gsm and less than or equal to 70 gsm, greater than or equal to 50 gsm and less than or equal to 90 gsm, or greater than or equal to 60 gsm and less than or equal to 80 gsm). In embodiments in which a filter media comprises two or more additional layers, each additional layer may independently have a basis weight in one or more of the ranges described above.

The additional layer(s) (e.g., support layer) may have any suitable thickness. In some embodiments, the additional layer(s) has a thickness of greater than or equal to 35 microns, greater than or equal to 40 microns, greater than or equal to 45 microns, greater than or equal to 50 microns, greater than or equal to 55 microns, greater than or equal to 60 microns, greater than or equal to 64 microns, greater than or equal to 70 microns, greater than or equal to 75 microns, greater than or equal to 80 microns, greater than or equal to 85 microns, greater than or equal to 90 microns, greater than or equal to 95 microns, greater than or equal to 100 microns, greater than or equal to 105 microns, greater than or equal to 110 microns, greater than or equal to 150 microns, greater than or equal to 250 microns, greater than or equal to 500 microns, greater than or equal to 1 mm, greater than or equal to 2 mm, greater than or equal to 3 mm, greater than or equal to 4 mm, greater than or equal to 5 mm, greater than or equal to 10 mm, greater than or equal to 20 mm, greater than or equal to 30 mm, or greater than or equal to 40 mm. In some embodiments, the additional layer(s) has a thickness of less than or equal to 50 mm, less than or equal to 40 mm, less than or equal to 30 mm, less than or equal to 20 mm, less than or equal to 10 mm, less than or equal to 5 mm, less than or equal to 4 mm, less than or equal to 3 mm, less than or equal to 2 mm, less than or equal to 1 mm, less than or equal to 750 microns, less than or equal to 500 microns, less than or equal to 250 microns, less than or equal to 150 microns, less than or equal to 115 microns, less than or equal to 110 microns, less than or equal to 105 microns, less than or equal to 100 microns, less than or equal to 95 microns, less than or equal to 89 microns, less than or equal to 85 microns, less than or equal to 80 microns, less than or equal to 75 microns, less than or equal to 70 microns, less than or equal to 65 microns, less than or equal to 60 microns, less than or equal to 55 microns, less than or equal to 50 microns, less than or equal to 45 microns, or less than or equal to 40 microns. Combinations of these ranges are also possible (e.g., greater than or equal to 35 microns and less than or equal to 50 mm, greater than or equal to 35 microns and less than or equal to 115 microns, greater than or equal to 64 microns and less than or equal to 89 microns, or greater than or equal to 70 microns and less than or equal to 80 microns). In embodiments in which a filter media comprises two or more additional layers, each additional layer may independently have a thickness in one or more of the ranges described above. In embodiments where the thickness is less than or equal to 300 microns, the thickness may be measured by measuring the average cross-sectional dimension (e.g., at 5 locations) using Scanning Electron Microscopy. In embodiments where the thickness is greater than 300 microns, the thickness may be measured using a Paper Thickness Gauge & Digital Micrometer (e.g., Model 49-86), with a foot size of 1 square inch and a pressure of 2.65 Psi.

The additional layer(s) may have any suitable maximum pore size. In some embodiments, the additional layer(s) has a maximum pore size of greater than or equal to 1 micron, greater than or equal to 5 microns, greater than or equal to 10 microns, greater than or equal to 25 microns, greater than or equal to 50 microns, greater than or equal to 75 microns, greater than or equal to 100 microns, greater than or equal to 125 microns, greater than or equal to 150 microns, greater than or equal to 175 microns, greater than or equal to 200 microns, greater than or equal to 250 microns, greater than or equal to 300 microns, greater than or equal to 400 microns, greater than or equal to 500 microns, greater than or equal to 600 microns, greater than or equal to 700 microns, greater than or equal to 800 microns, greater than or equal to 900 microns, greater than or equal to 1 mm, greater than or equal to 1.25 mm, greater than or equal to 1.5 mm, greater than or equal to 1.75 mm, greater than or equal to 2 mm, greater than or equal to 2.25 mm, greater than or equal to 2.5 mm, greater than or equal to 3 mm, greater than or equal to 4 mm, greater than or equal to 5 mm, greater than or equal to 6 mm, greater than or equal to 7 mm, greater than or equal to 8 mm, or greater than or equal to 9 mm. In some embodiments, the additional layer(s) has a maximum pore size of less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2.5 mm, less than or equal to 2.25 mm, less than or equal to 2 mm, less than or equal to 1.75 mm, less than or equal to 1.5 mm, less than or equal to 1.25 mm, less than or equal to 1 mm, less than or equal to 900 microns, less than or equal to 800 microns, less than or equal to 700 microns, less than or equal to 600 microns, less than or equal to 500 microns, less than or equal to 400 microns, less than or equal to 300 microns, less than or equal to 200 microns, less than or equal to 175 microns, less than or equal to 150 microns, less than or equal to 125 microns, less than or equal to 100 microns, less than or equal to 75 microns, less than or equal to 50 microns, less than or equal to 25 microns, or less than or equal to 10 microns. Combinations of these ranges are also possible (e.g., greater than or equal to 1 micron and less than or equal to 10 mm, greater than or equal to 150 microns and less than or equal to 2.5 mm, or greater than or equal to 150 microns and less than or equal to 800 microns). In embodiments in which a filter media comprises two or more additional layers, each additional layer may independently have a maximum pore size in one or more of the ranges described above.

The additional layer(s) may have any suitable mean flow pore size. In some embodiments, the additional layer(s) has a mean flow pore size of greater than or equal to 100 nm, greater than or equal to 250 nm, greater than or equal to 500 nm, greater than or equal to 750 nm, greater than or equal to 1 micron, greater than or equal to 5 microns, greater than or equal to 10 microns, greater than or equal to 25 microns, greater than or equal to 50 microns, greater than or equal to 75 microns, greater than or equal to 100 microns, or greater than or equal to 150 microns. In some embodiments, the additional layer(s) has a mean flow pore size of less than or equal to 200 microns, less than or equal to 150 microns, less than or equal to 100 microns, less than or equal to 75 microns, less than or equal to 50 microns, less than or equal to 25 microns, less than or equal to 10 microns, less than or equal to 5 microns, less than or equal to 1 micron, less than or equal to 750 nm, less than or equal to 500 nm, or less than or equal to 250 nm. Combinations of these ranges are also possible (e.g., greater than or equal to 100 nm and less than or equal to 200 microns). In embodiments in which a filter media comprises two or more additional layers, each additional layer may independently have a mean flow pore size in one or more of the ranges described above.

The additional layer(s) may have any suitable air permeability. In some embodiments, the additional layer(s) has an air permeability of greater than or equal to 0.5 CFM, greater than or equal to 1 CFM, greater than or equal to 5 CFM, greater than or equal to 10 CFM, greater than or equal to 20 CFM, greater than or equal to 25 CFM, greater than or equal to 30 CFM, greater than or equal to 35 CFM, greater than or equal to 40 CFM, greater than or equal to 45 CFM, greater than or equal to 50 CFM, greater than or equal to 55 CFM, greater than or equal to 75 CFM, greater than or equal to 100 CFM, greater than or equal to 200 CFM, greater than or equal to 500 CFM, greater than or equal to 1,000 CFM. In some embodiments, the additional layer(s) has an air permeability of less than or equal to 8,000 CFM, less than or equal to 5,000 CFM, less than or equal to 1,000 CFM, less than or equal to 500 CFM, less than or equal to 250 CFM, less than or equal to 100 CFM, less than or equal to 60 CFM, less than or equal to 55 CFM, less than or equal to 50 CFM, less than or equal to 45 CFM, less than or equal to 35 CFM, less than or equal to 30 CFM, or less than or equal to 25 CFM. Combinations of these ranges are also possible (e.g., greater than or equal to 0.5 CFM and less than or equal to 8,000 CFM, greater than or equal to 20 CFM and less than or equal to 60 CFM, greater than or equal to 30 CFM and less than or equal to 50 CFM, or greater than or equal to 35 CFM and less than or equal to 45 CFM). In embodiments in which a filter media comprises two or more additional layers, each additional layer may independently have an air permeability in one or more of the ranges described above.

The additional layer(s) (e.g., support layer) may have any suitable elongation at break. In some embodiments, the additional layer(s) has an elongation at break of greater than or equal to 1%, greater than or equal to 2%, greater than or equal to 3%, greater than or equal to 4%, greater than or equal to 5%, greater than or equal to 10%, greater than or equal to 15%, greater than or equal to 20%, greater than or equal to 25%, greater than or equal to 30%, greater than or equal to 35%, greater than or equal to 40%, or greater than or equal to 45%. In some embodiments, the additional layer(s) has an elongation at break of less than or equal to 50%, less than or equal to 45%, less than or equal to 40%, less than or equal to 35%, less than or equal to 33%, less than or equal to 30%, less than or equal to 25%, less than or equal to 20%, less than or equal to 15%, less than or equal to 10%, or less than or equal to 5%. Combinations of these ranges are also possible (e.g., greater than or equal to 1% and less than or equal to 50%). In embodiments in which a filter media comprises two or more additional layers, each additional layer may independently have an elongation at break in one or more of the ranges described above.

A non-limiting example of an additional layer is a support layer. The support layer may have any features (or combinations of features) described herein for an additional layer.

The support layer may support another layer present in the filter media (e.g., the PES-based fine fiber layer) and/or may be a layer onto which another layer was deposited during fabrication of the filter media. For example, in some embodiments, a filter media may comprise a support layer onto which a PES-based fine fiber layer was deposited (e.g., via electrospinning). The support layer may provide structural support and/or enhance the ease with which the filter media may be fabricated without appreciably increasing the resistance of the filter media. In some embodiments, the support layer does not contribute appreciably to the filtration performance of the filter media. In other embodiments, the support layer may enhance the performance of the filter media in one or more ways (e.g., it may serve as a prefilter layer).

In some embodiments, the support layer is adjacent to the PES-based fine fiber layer. In some embodiments, the support layer is directly adjacent to the PES-based fine fiber layer without any intervening layers between the support layer and the PES-based fine fiber layer. In some embodiments, the support layer is downstream of the PES-based fine fiber layer. In some embodiments, the support layer is upstream of the PES-based fine fiber layer. In some embodiments, the PES-based fine fiber layer is positioned between two support layers.

In some embodiments, the support layer) is non-fibrous. For example, the support layer may comprise a plastic film, a membrane (e.g., plastic membrane), and/or metallic foil, as described above. In some embodiments, the support layer is fibrous. In some embodiments, the support layer comprises synthetic fibers, glass fibers, and/or cellulose fibers, as described above.

The support layer may have any suitable average fiber diameter. In some embodiments, the support layer has an average fiber diameter described above for the additional layer(s). In some embodiments, the support layer may have a different average fiber diameter than that described above for the additional layer(s). For example, in some embodiments, the support layer has an average fiber diameter of greater than or equal to 0.2 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 20 microns, greater than or equal to 30 microns, greater than or equal to 40 microns, greater than or equal to 50 microns, greater than or equal to 75 microns, greater than or equal to 100 microns, greater than or equal to 125 microns, greater than or equal to 150 microns, greater than or equal to 200 microns, or greater than or equal to 250 microns. In some embodiments, the support layer has an average fiber diameter of less than or equal to 300 microns, less than or equal to 250 microns, less than or equal to 200 microns, less than or equal to 150 microns, less than or equal to 125 microns, less than or equal to 100 microns, less than or equal to 75 microns, less than or equal to 50 microns, less than or equal to 40 microns, less than or equal to 30 microns, less than or equal to 20 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.2 microns and less than or equal to 300 microns).

In some embodiments, the support layer has the average fiber length described above for the additional layer.

The support layer may have any suitable maximum pore size. In some embodiments, the support layer has a maximum pore size described above for the additional layer(s). In some embodiments, the support layer has a maximum pore size different from that described above for the additional layer(s). In some embodiments, the support layer has a maximum pore size of greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 16 microns, greater than or equal to 17 microns, greater than or equal to 18 microns, greater than or equal to 19 microns, greater than or equal to 20 microns, greater than or equal to 21 microns, greater than or equal to 22 microns, greater than or equal to 23 microns, or greater than or equal to 24 microns. In some embodiments, the support layer has a maximum pore size of less than or equal to 25 microns, less than or equal to 24 microns, less than or equal to 23 microns, less than or equal to 22 microns, less than or equal to 21 microns, less than or equal to 20 microns, less than or equal to 19 microns, less than or equal to 18 microns, less than or equal to 17 microns, less than or equal to 16 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, or less than or equal to 6 microns. Combinations of these ranges are also possible (e.g., greater than or equal to 5 microns and less than or equal to 25 microns, greater than or equal to 12 microns and less than or equal to 20 microns, or greater than or equal to 15 microns and less than or equal to 18 microns).

The ratio of the average fiber diameter of the PES-based fine fiber layer to the maximum pore size of the support layer may be any suitable ratio. In some embodiments, a filter media comprising a larger (e.g., greater than or equal to 0.003:1 or larger) ratio of the average fiber diameter of the PES-based fine fiber layer to the maximum pore size of the support layer has lower amounts of macro defects than a filter media comprising a lower ratio of the average fiber diameter of the PES-based fine fiber layer to the maximum pore size of the support layer (all other factors being equal). In some embodiments, the ratio of the average fiber diameter of the PES-based fine fiber layer to the maximum pore size of the support layer is greater than or equal to 0.003:1, greater than or equal to 0.004:1, greater than or equal to 0.005:1, greater than or equal to 0.006:1, greater than or equal to 0.007:1, greater than or equal to 0.008:1, greater than or equal to 0.009:1, greater than or equal to 0.01:1, greater than or equal to 0.011:1, greater than or equal to 0.012:1, greater than or equal to 0.013:1, greater than or equal to 0.014:1, greater than or equal to 0.015:1, greater than or equal to 0.016:1, greater than or equal to 0.017:1, greater than or equal to 0.018:1, greater than or equal to 0.019:1, greater than or equal to 0.02:1, greater than or equal to 0.021:1, greater than or equal to 0.022:1, greater than or equal to 0.025:1, greater than or equal to 0.03:1, greater than or equal to 0.035:1, greater than or equal to 0.04:1, greater than or equal to 0.05:1, greater than or equal to 0.1:1, greater than or equal to 0.2:1, greater than or equal to 0.3:1, greater than or equal to 0.4:1, greater than or equal to 0.5:1, greater than or equal to 0.6:1, or greater than or equal to 0.7:1. In some embodiments, the ratio of the average fiber diameter of the PES-based fine fiber layer to the maximum pore size of the support layer is less than or equal to 0.8:1, less than or equal to 0.7:1, less than or equal to 0.6:1, less than or equal to 0.5:1, less than or equal to 0.4:1, less than or equal to 0.3:1, less than or equal to 0.2:1, less than or equal to 0.1:1, less than or equal to 0.05:1, less than or equal to 0.04:1, less than or equal to 0.035:1, less than or equal to 0.03:1, less than or equal to 0.025:1, less than or equal to 0.023:1, less than or equal to 0.022:1, less than or equal to 0.021:1, less than or equal to 0.02:1, less than or equal to 0.019:1, less than or equal to 0.018:1, less than or equal to 0.017:1, less than or equal to 0.016:1, less than or equal to 0.015:1, less than or equal to 0.014:1, less than or equal to 0.013:1, less than or equal to 0.012:1, less than or equal to 0.011:1, less than or equal to 0.01:1, less than or equal to 0.009:1, less than or equal to 0.008:1, less than or equal to 0.007:1, less than or equal to 0.006:1, or less than or equal to 0.005:1. Combinations of these ranges are also possible (e.g., greater than or equal to 0.003:1 and less than or equal to 0.8:1, greater than or equal to 0.01:1 and less than or equal to 0.035:1, or greater than or equal to 0.012:1 and less than or equal to 0.023:1).

The support layer may have any suitable mean flow pore size. In some embodiments, the support layer has a mean flow pore size described above for the additional layer(s). In some embodiments, the support layer has a mean flow pore size different than that described above for the additional layer(s). In some embodiments, the support layer has a mean flow pore size of greater than or equal to 2 microns, greater than or equal to 2.5 microns, greater than or equal to 3 microns, greater than or equal to 3.5 microns, greater than or equal to 4 microns, greater than or equal to 4.5 microns, greater than or equal to 5 microns, greater than or equal to 5.5 microns, greater than or equal to 6 microns, greater than or equal to 6.5 microns, greater than or equal to 7 microns, or greater than or equal to 7.5 microns. In some embodiments, the support layer has a mean flow pore size of less than or equal to 8 microns, less than or equal to 7.5 microns, less than or equal to 7 microns, less than or equal to 6.5 microns, less than or equal to 6 microns, less than or equal to 5.5 microns, less than or equal to 5 microns, or less than or equal to 4.5 microns. Combinations of these ranges are also possible (e.g., greater than or equal to 2 microns and less than or equal to 8 microns, greater than or equal to 3 microns and less than or equal to 7 microns, or greater than or equal to 4 microns and less than or equal to 6 microns).

The ratio of the mean flow pore size of the PES-based fine fiber layer to the mean flow pore size of the support layer may be any suitable ratio. In some embodiments, the smaller the ratio, the better the performance (e.g., the higher filtration efficiency and the higher water flow rate). In some embodiments, the mean flow pore size of the PES-based fine fiber layer to the mean flow pore size of the support layer is greater than or equal to 0.075:1, greater than or equal to 0.08:1, greater than or equal to 0.09:1, greater than or equal to 0.1:1, greater than or equal to 0.11:1, greater than or equal to 0.12:1, greater than or equal to 0.125:1, greater than or equal to 0.13:1, greater than or equal to 0.14:1, greater than or equal to 0.15:1, greater than or equal to 0.16:1, greater than or equal to 0.17:1, greater than or equal to 0.18:1, greater than or equal to 0.19:1, or greater than or equal to 0.2:1. In some embodiments, the mean flow pore size of the PES-based fine fiber layer to the mean flow pore size of the support layer is less than or equal to 0.2125:1, less than or equal to 0.21:1, less than or equal to 0.2:1, less than or equal to 0.19:1, less than or equal to 0.18:1, less than or equal to 0.17:1, less than or equal to 0.16:1, less than or equal to 0.15:1, less than or equal to 0.143:1, less than or equal to 0.133:1, less than or equal to 0.13:1, less than or equal to 0.12:1, less than or equal to 0.11:1, less than or equal to 0.1:1, less than or equal to 0.09:1, or less than or equal to 0.08:1. Combinations of these ranges are also possible (e.g., greater than or equal to 0.075:1 and less than or equal to 0.2125:1, greater than or equal to 0.075:1 and less than or equal to 0.133:1, greater than or equal to 0.1:1 and less than or equal to 0.143:1, greater than or equal to 0.125:1 and less than or equal to 0.2125:1, or greater than or equal to 0.125:1 and less than or equal to 0.133:1).

The support layer may have any suitable air permeability. In some embodiments, the support layer has an air permeability described above for the additional layer(s). In some embodiments, the support layer has an air permeability that is different from that described above for the additional layer(s). In some embodiments, the support layer has an air permeability of greater than or equal to 5 CFM, greater than or equal to 6 CFM, greater than or equal to 7 CFM, greater than or equal to 8 CFM, greater than or equal to 9 CFM, greater than or equal to 10 CFM, greater than or equal to 11 CFM, greater than or equal to 12 CFM, greater than or equal to 13 CFM, greater than or equal to 14 CFM, greater than or equal to 15 CFM, greater than or equal to 16 CFM, greater than or equal to 17 CFM, greater than or equal to 18 CFM, greater than or equal to 19 CFM, greater than or equal to 20

CFM, greater than or equal to 21 CFM, greater than or equal to 22 CFM, greater than or equal to 23 CFM, greater than or equal to 24 CFM, greater than or equal to 25 CFM, greater than or equal to 50 CFM, greater than or equal to 100 CFM, greater than or equal to 250 CFM, greater than or equal to 500 CFM, greater than or equal to 750 CFM, greater than or equal to 1,000 CFM, or greater than or equal to 1,250 CFM. In some embodiments, the support layer has an air permeability of less than or equal to 1,500 CFM, less than or equal to 1,250 CFM, less than or equal to 1,000 CFM, less than or equal to 750 CFM, less than or equal to 500 CFM, less than or equal to 250 CFM, less than or equal to 100 CFM, less than or equal to 50 CFM, less than or equal to 25 CFM, less than or equal to 24 CFM, less than or equal to 23 CFM, less than or equal to 22 CFM, less than or equal to 21 CFM, less than or equal to 20 CFM, less than or equal to 19 CFM, less than or equal to 18 CFM, less than or equal to 17 CFM, less than or equal to 16 CFM, less than or equal to 15 CFM, less than or equal to 14 CFM, less than or equal to 13 CFM, less than or equal to 12 CFM, less than or equal to 11 CFM, less than or equal to 10 CFM, less than or equal to 9 CFM, less than or equal to 8 CFM, less than or equal to 7 CFM, or less than or equal to 6 CFM. Combinations of these ranges are also possible (e.g., greater than or equal to 5 CFM and less than or equal to 1,500 CFM, greater than or equal to 5 CFM and less than or equal to 25 CFM, greater than or equal to 10 CFM and less than or equal to 20 CFM, or greater than or equal to 12 CFM and less than or equal to 18 CFM).

As noted above, the additional layer(s) may be any type of layer, including an efficiency layer, a prefilter layer, and/or a support layer. In some embodiments, the properties of these layers may be any of those described above.

The filter media may have any suitable properties.

The filter media may have any suitable thickness. In some embodiments, the filter media has a thickness of greater than or equal to 0.001 mm, greater than or equal to 0.002 mm, greater than or equal to 0.003 mm, greater than or equal to 0.004 mm, greater than or equal to 0.005 mm, greater than or equal to 0.01 mm, greater than or equal to 0.02 mm, greater than or equal to 0.03 mm, greater than or equal to 0.04 mm, greater than or equal to 0.05 mm, greater than or equal to 0.06 mm, greater than or equal to 0.07 mm, greater than or equal to 0.08 mm, greater than or equal to 0.09 mm, greater than or equal to 0.1 mm, greater than or equal to 0.15 mm, greater than or equal to 0.2 mm, greater than or equal to 0.25 mm, greater than or equal to 0.3 mm, greater than or equal to 0.035 mm, greater than or equal to 0.4 mm, greater than or equal to 0.45 mm, greater than or equal to 0.5 mm, greater than or equal to 1 mm, greater than or equal to 5 mm, greater than or equal to 10 mm, greater than or equal to 25 mm, or greater than or equal to 50 mm. In some embodiments, the filter media has a thickness of less than or equal to 60 mm, less than or equal to 50 mm, less than or equal to 40 mm, less than or equal to 30 mm, less than or equal to 20 mm, less than or equal to 10 mm, less than or equal to 5 mm, less than or equal to 1 mm, less than or equal to 0.6 mm, less than or equal to 0.5 mm, less than or equal to 0.45 mm, less than or equal to 0.4 mm, less than or equal to 0.35 mm, less than or equal to 0.3 mm, less than or equal to 0.25 mm, less than or equal to 0.2 mm, less than or equal to 0.15 mm, less than or equal to 0.1 mm, less than or equal to 0.09 mm, less than or equal to 0.08 mm, less than or equal to 0.07 mm, less than or equal to 0.06 mm, less than or equal to 0.05 mm, less than or equal to 0.04 mm, less than or equal to 0.03 mm, less than or equal to 0.02 mm, less than or equal to 0.01 mm, less than or equal to 0.005 mm, less than or equal to 0.004 mm, less than or equal to 0.003 mm, or less than or equal to 0.002 mm. Combinations of these ranges are also possible (e.g., greater than or equal to 0.001 mm and less than or equal to 60 mm, greater than or equal to 0.001 mm and less than or equal to 0.6 mm, greater than or equal to 0.001 mm and less than or equal to 0.5 mm, greater than or equal to 0.002 mm and less than or equal to 0.25 mm, or greater than or equal to 0.004 mm and less than or equal to 0.1 mm). In embodiments where the thickness is less than or equal to 300 microns, the thickness may be measured by measuring the average cross-sectional dimension (e.g., at 5 locations) using Scanning Electron Microscopy. In embodiments where the thickness is greater than 300 microns, the thickness may be measured using Paper Thickness Gauge & Digital Microm-eter (e.g., Model 49-86), with a foot size of 1 square inch and a pressure of 2.65 Psi.

The filter media may have any suitable basis weight. In some embodiments, the filter media has a basis weight of greater than or equal to 40 gsm, greater than or equal to 45 gsm, greater than or equal to 50 gsm, greater than or equal to 55 gsm, greater than or equal to 60 gsm, greater than or equal to 65 gsm, greater than or equal to 70 gsm, greater than or equal to 75 gsm, greater than or equal to 80 gsm, greater than or equal to 85 gsm, greater than or equal to 90 gsm, greater than or equal to 95 gsm, greater than or equal to 100 gsm, greater than or equal to 125 gsm, greater than or equal to 150 gsm, greater than or equal to 200 gsm, greater than or equal to 250 gsm, greater than or equal to 300 gsm, greater than or equal to 500 gsm, greater than or equal to 750 gsm, greater than or equal to 1,000 gsm, greater than or equal to 1,250 gsm, greater than or equal to 1,500 gsm, or greater than or equal to 1,750 gsm. In some embodiments, the filter media has a basis weight of less than or equal to 2,000 gsm, less than or equal to 1,750 gsm, less than or equal to 1,500 gsm, less than or equal to 1,250 gsm, less than or equal to 1,000 gsm, less than or equal to 750 gsm, less than or equal to 500 gsm, less than or equal to 350 gsm, less than or equal to 300 gsm, less than or equal to 250 gsm, less than or equal to 200 gsm, less than or equal to 150 gsm, less than or equal to 100 gsm, less than or equal to 95 gsm, less than or equal to 90 gsm, less than or equal to 85 gsm, less than or equal to 80 gsm, less than or equal to 75 gsm, less than or equal to 70 gsm, less than or equal to 65 gsm, less than or equal to 60 gsm, less than or equal to 55 gsm, less than or equal to 50 gsm, or less than or equal to 45 gsm. Combinations of these ranges are also possible (e.g., greater than or equal to 40 gsm and less than or equal to 2,000 gsm, greater than or equal to 40 gsm and less than or equal to 350 gsm, greater than or equal to 40 gsm and less than or equal to 100 gsm, greater than or equal to 50 gsm and less than or equal to 90 gsm, or greater than or equal to 60 gsm and less than or equal to 80 gsm).

The filter media may have any suitable air permeability. In some embodiments, the filter media has an air perme-ability of greater than or equal to 20 CFM, greater than or equal to 25 CFM, greater than or equal to 30 CFM, greater than or equal to 35 CFM, greater than or equal to 40 CFM, greater than or equal to 45 CFM, greater than or equal to 50 CFM, or greater than or equal to 55 CFM. In some embodi-ments, the filter media has an air permeability of less than or equal to 60 CFM, less than or equal to 55 CFM, less than or equal to 50 CFM, less than or equal to 45 CFM, less than or equal to 40 CFM, less than or equal to 35 CFM, less than or equal to 30 CFM, or less than or equal to 25 CFM. Combinations of these ranges are also possible (e.g., greater than or equal to 20 CFM and less than or equal to 60 CFM, greater than or equal to 30 CFM and less than or equal to 50 CFM, or greater than or equal to 35 CFM and less than or equal to 45 CFM).

The filter media may have any suitable dust holding capacity. In some embodiments, the filter media has a dust holding capacity of greater than or equal to 2 gsm, greater than or equal to 3 gsm, greater than or equal to 4 gsm, greater than or equal to 5 gsm, greater than or equal to 10 gsm, greater than or equal to 20 gsm, greater than or equal to 30 gsm, greater than or equal to 40 gsm, greater than or equal to 50 gsm, greater than or equal to 60 gsm, greater than or equal to 75 gsm, greater than or equal to 100 gsm, greater than or equal to 125 gsm, greater than or equal to 150 gsm, greater than or equal to 200 gsm, or greater than or equal to 250 gsm. In some embodiments, the filter media has a dust holding capacity of less than or equal to 300 gsm, less than or equal to 250 gsm, less than or equal to 200 gsm, less than or equal to 150 gsm, less than or equal to 125 gsm, less than or equal to 100 gsm, less than or equal to 75 gsm, less than or equal to 60 gsm, less than or equal to 50 gsm, less than or equal to 40 gsm, less than or equal to 30 gsm, less than or equal to 20 gsm, less than or equal to 10 gsm, or less than or equal to 5 gsm. Combinations of these ranges are also possible (e.g., greater than or equal to 2 gsm and less than or equal to 300 gsm, greater than or equal to 3 gsm and less than or equal to 200 gsm, or greater than or equal to 5 gsm and less than or equal to 100 gsm). Dust holding capacity may be measured according to EN-13443-2 (2007) using clay particles with a median size of 1 micron at 1 mg/L in water, at a 15 L/min flow rate and a temperature of 23° C. (±2° C.), until the pressure drop reaches 2 bars. The filter media may have any suitable initial efficiency. In some embodiments, the filter media has an initial efficiency of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, or greater than or equal to 99.99%. In some embodiments, the filter media has an initial efficiency of less than 100%, less than or equal to 99.99%, less than or equal to 99%, less than or equal to 98%, less than or equal to 95%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of these ranges are also pos-sible (e.g., greater than or equal to 5% and less than 100%). Initial efficiency may be measured according to ISO 19438 (2013).

The filter media may have any suitable average efficiency. In some embodiments, the filter media has an average efficiency measured according to ISO 19438 (2013) (e.g., for fuel) (e.g., with 4 micron or 10 micron particles), ISO 16889 (2008) (e.g., for fuel) (e.g., with 4 micron or 10 micron particles), ISO 4548 (2012) (e.g., for oil filtration) (e.g., for 20 micron or 30 micron particles), SAEJ1488 (2010) (e.g., for fuel water separation), or EN-13443-2 (2007) of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, or greater than or equal to 99.99%. In some embodiments, the filter media has an average efficiency ISO 19438 (2013) (e.g., for fuel) (e.g., with 4 micron or 10 micron particles), ISO 16889 (2008) (e.g., for fuel) (e.g., with 4 micron or 10 micron particles), ISO 4548 (2012) (e.g., for oil filtration) (e.g., for 20 micron or 30 micron particles), SAEJ1488 (2010) (e.g., for fuel water separation), or EN-13443-2 (2007) of less than 100%, less than or equal to 99.99%, less than or equal to 99%, less than or equal to 98%, less than or equal to 95%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10%. Combinations of these ranges are also possible (e.g., greater than or equal to 5% and less than 100%).

In some embodiments, the filter media has an overall liquid filtration efficiency of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95%, greater than or equal to 98%, greater than or equal to 99%, greater than or equal to 99.5%, greater than or equal to 99.9%, or greater than or equal to 99.99%. In some embodiments, the filter media has an overall liquid filtration efficiency of less than 100%, less than or equal to 99.99%, less than or equal to 99.9%, less than or equal to 99.5%, less than or equal to 99%, less than or equal to 98%, less than or equal to 95%, less than or equal to 90%, less than or equal to 80%, less than or equal to 70%, less than or equal to 60%, less than or equal to 50%, less than or equal to 40%, or less than or equal to 30%. Combinations of these ranges are also possible (e.g., greater than or equal to 5% and less than 100%). The overall liquid filtration efficiency of a filter media may be measured by prewetting a flat sheet disc of the filter media with a 70% isopropyl alcohol solution, placing the flat sheet disc at the bottom of a stirred cell (e.g., AMI UHP-43), adding 25 mL of a challenge solution to the stirred cell (where the challenge solution is deionized water with monodispersed 0.2 micron latex particles and has a turbidity of 180 NTU, as measured by a turbidity meter), applying less than 1 psi of pressure to facilitate flow of the challenge solution through the flat sheet disc, and then measuring the turbidity of the solution that flows through the flat sheet disc with the same turbidity meter (e.g., MicroTPI System, HF Scientific). The overall liquid filtration efficiency may be determined by the following equation:

$$\text{Efficiency} = 100 \times ((\text{Turbidity of Challenge Solution} - \text{Turbidity of Flow Through})/\text{Turbidity of Challenge Solution}).$$

The filter media may have any suitable water flow rate. In some embodiments, the filter media has a water flow rate of greater than or equal to 25 mL/min, greater than or equal to 50 mL/min, greater than or equal to 100 mL/min, greater than or equal to 250 mL/min, greater than or equal to 500 mL/min, greater than or equal to 750 mL/min, greater than or equal to 1,000 mL/min, greater than or equal to 1,500 mL/min, or greater than or equal to 2,000 mL/min. In some embodiments, the filter media has a water flow rate of less than or equal to 2,500 mL/min, less than or equal to 2,000 mL/min, less than or equal to 1,500 mL/min, less than or equal to 1,000 mL/min, less than or equal to 750 mL/min, less than or equal to 500 mL/min, less than or equal to 250 mL/min, less than or equal to 100 mL/min, less than or equal to 50 mL/min, or less than or equal to 25 mL/min. Combinations of these ranges are also possible (e.g., greater than or equal to 25 mL/min and less than or equal to 2,500 mL/min or greater than or equal to 50 mL/min and less than or equal to 1,500 mL/min). Water flow rate may be measured by pumping 1,000 ml of deionized water through each of three flat sheet test specimens at 20 psi pressure. The time required for the 1000 ml to flow through is measured for each of the three flat sheets and the flow rate (1000 ml/time of flow through) is determined. The three flow rates are then averaged.

The filter media may have any suitable pressure drop. In some embodiments, the filter media has a pressure drop of greater than or equal to 30 mbar, greater than or equal to 50 mbar, greater than or equal to 75 mbar, greater than or equal to 100 mbar, greater than or equal to 250 mbar, greater than or equal to 500 mbar, greater than or equal to 750 mbar, greater than or equal to 1,000 mbar, greater than or equal to 1,250 mbar, greater than or equal to 1,500 mbar, greater than or equal to 1,750 mbar, or greater than or equal to 2,000 mbar. In some embodiments, the filter media has a pressure drop of less than or equal to 2,200 mbar, less than or equal to 2,000 mbar, less than or equal to 1,750 mbar, less than or equal to 1,500 mbar, less than or equal to 1,250 mbar, less than or equal to 1,000 mbar, less than or equal to 750 mbar, less than or equal to 500 mbar, less than or equal to 250 mbar, less than or equal to 100 mbar, less than or equal to 75 mbar, or less than or equal to 50 mbar. Combinations of these ranges are also possible (e.g., greater than or equal to 30 mbar and less than or equal to 2,200 mbar). Pressure drop may be measured based on IFTS protocol FEEIS-01:2013, using microfiltered water at a 20 L/min flow rate and a temperature of 23° C.

In some embodiments, a filter media described herein may be a component of a filter element. That is, the filter media may be incorporated into an article suitable for use by an end user. Non-limiting examples of suitable filter elements include flat panel filters, V-bank filters (comprising, e.g., between 1 and 24 Vs), cartridge filters, cylindrical filters, conical filters, and curvilinear filters. Filter elements may have any suitable height (e.g., between 2 inches and 124 inches for flat panel filters, between 4 inches and 124 inches for V-bank filters, between 1 inch and 124 inches for cartridge and cylindrical filter media). Filter elements may also have any suitable width (between 2 inches and 124 inches for flat panel filters, between 4 inches and 124 inches for V-bank filters). Some filter media (e.g., cartridge filter media, cylindrical filter media) may be characterized by a diameter instead of a width; these filter media may have a diameter of any suitable value (e.g., between 1 inch and 124 inches). Filter elements typically comprise a frame, which may be made of one or more materials such as cardboard, aluminum, steel, alloys, wood, and polymers.

In some embodiments, a filter media described herein may be a component of a filter element and may be pleated. The pleat height and pleat density (number of pleats per unit length of the media) may be selected as desired. In some embodiments, the pleat height may be greater than or equal to 10 mm, greater than or equal to 15 mm, greater than or equal to 20 mm, greater than or equal to 25 mm, greater than or equal to 30 mm, greater than or equal to 35 mm, greater than or equal to 40 mm, greater than or equal to 45 mm, greater than or equal to 50 mm, greater than or equal to 53 mm, greater than or equal to 55 mm, greater than or equal to 60 mm, greater than or equal to 65 mm, greater than or equal to 70 mm, greater than or equal to 75 mm, greater than or equal to 80 mm, greater than or equal to 85 mm, greater than or equal to 90 mm, greater than or equal to 95 mm, greater than or equal to 100 mm, greater than or equal to 125 mm, greater than or equal to 150 mm, greater than or equal to 175 mm, greater than or equal to 200 mm, greater than or equal to 225 mm, greater than or equal to 250 mm, greater than or equal to 275 mm, greater than or equal to 300 mm, greater than or equal to 325 mm, greater than or equal to 350 mm, greater than or equal to 375 mm, greater than or equal to 400 mm, greater than or equal to 425 mm, greater than or equal to 450 mm, greater than or equal to 475 mm, or greater than or equal to 500 mm. In some embodiments, the pleat height is less than or equal to 510 mm, less than or equal to 500 mm, less than or equal to 475 mm, less than or equal to 450 mm, less than or equal to 425 mm, less than or equal to 400 mm, less than or equal to 375 mm, less than or equal to 350 mm, less than or equal to 325 mm, less than or equal to 300 mm, less than or equal to 275 mm, less than or equal to 250 mm, less than or equal to 225 mm, less than or equal to 200 mm, less than or equal to 175 mm, less than or equal to 150 mm, less than or equal to 125 mm, less than or equal to 100 mm, less than or equal to 95 mm, less than or equal to 90 mm, less than or equal to 85 mm, less than or equal to 80 mm, less than or equal to 75 mm, less than or equal to 70 mm, less than or equal to 65 mm, less than or equal to 60 mm, less than or equal to 55 mm, less than or equal to 53 mm, less than or equal to 50 mm, less than or equal to 45 mm, less than or equal to 40 mm, less than or equal to 35 mm, less than or equal to 30 mm, less than or equal to 25 mm, less than or equal to 20 mm, or less than or equal to 15 mm. Combinations of the above-referenced ranges are also possible (e.g., greater than or equal to 10 mm and less than or equal to 510 mm, or greater than or equal to 10 mm and less than or equal to 100 mm). Other ranges are also possible.

In some embodiments, a filter media has a pleat density of greater than or equal to 5 pleats per 100 mm, greater than or equal to 6 pleats per 100 mm, greater than or equal to 10 pleats per 100 mm, greater than or equal to 15 pleats per 100 mm, greater than or equal to 20 pleats per 100 mm, greater than or equal to 25 pleats per 100 mm, greater than or equal to 28 pleats per 100 mm, greater than or equal to 30 pleats per 100 mm, or greater than or equal to 35 pleats per 100 mm. In some embodiments, a filter media has a pleat density of less than or equal to 40 pleats per 100 mm, less than or equal to 35 pleats per 100 mm, less than or equal to 30 pleats per 100 mm, less than or equal to 28 pleats per 100 mm, less than or equal to 25 pleats per 100 mm, less than or equal to 20 pleats per 100 mm, less than or equal to 15 pleats per 100 mm, less than or equal to 10 pleats per 100 mm, or less than or equal to 6 pleats per 100 mm. Combinations of the above-referenced ranges are also possible (e.g., greater than or equal to 5 pleats per 100 mm and less than or equal to 100 pleats per 100 mm, greater than or equal to 6 pleats per 100 mm and less than or equal to 100 pleats per 100 mm, or greater than or equal to 25 pleats per 100 mm and less than or equal to 28 pleats per 100 mm). Other ranges are also possible.

Other pleat heights and densities may also be possible. For instance, filter media within flat panel or V-bank filters may have pleat heights between ¼ inch and 24 inches, and/or pleat densities between 1 and 50 pleats/inch. As another example, filter media within cartridge filters or conical filters may have pleat heights between ¼ inch and 24 inches and/or pleat densities between ½ and 100 pleats/inch. In some embodiments, pleats are separated by a pleat separator made of, e.g., polymer, glass, aluminum, and/or cotton. In other embodiments, the filter element lacks a pleat separator. The filter media may be wire-backed, or it may be self-supporting.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

In some embodiments, a filter media described herein is incorporated into a face mask.

In one set of embodiments, the filter media described herein is incorporated into a filter element having a cylindrical configuration, which may be suitable for hydraulic and other applications. The cylindrical filter element may include a steel support mesh that can provide pleat support and spacing, and which protects against media damage during handling and/or installation. The steel support mesh may be positioned as an upstream and/or downstream layer. The filter element can also include upstream and/or downstream support layers that can protect the filter media during pressure surges. These layers can be combined with filter media 10, which may include two or more layers as noted above.

In one set of embodiments, a filter media described herein is incorporated into a fuel filter element (e.g., a cylindrical fuel filter element). Fuel filter elements can be of varying types, e.g., fuel filter elements to remove particulates, fuel-water separators to remove water from diesel fuel, and fuel filter elements that perform both particulate separation and water separation. The fuel filter element may be a single stage element or multiple stage element. In some cases, the media can be pleated or wrapped, supported or unsupported, cowrapped/copleated with multiple media. In some designs, the media is pleated with a wrapped core in the center.

In some embodiments, a filter media described herein is incorporated into a fuel-water separator. A fuel-water separator may have a bowl-like design which collects water at the bottom. Depending on the water collection, the water may be collected upstream, downstream, or on both sides of the collection bowl. The water can then be drained off by opening a valve at the bottom of the bowl and letting the water run out, until the bowl contains only fuel/diesel. In some embodiments, the fuel-water separator may include a water sensor to signal the engine control unit, or to signal the driver directly, if the water reaches a warning level. The fuel-water separator may also include a sensor, which can alert the operator when the filter needs to be drained. In some cases, a heater may be positioned near the filter to help avoid the forming of paraffin wax (in case of low temperatures) inside the filter which can stop fuel flow to the engine.

In some embodiments, a filter media described herein is incorporated into a liquid (e.g., water) filter element. The water filters may be used for the removal of microorganisms, virus particles, and/or other contaminants. For instance, filter media suitable for water filtration may be used for the treatment of municipal water, residential water, and/or industrial water (e.g., mining water, cooling tower/boiler's water, nuclear water, ultra-pure water production for the semiconductor and biopharmaceutical industries).

The filter element may also have any suitable dimensions. For example, the filter element may have a length of at least 15 inches, at least 20 inches, at least 25 inches, at least 30 inches, at least 40 inches, or at least 45 inches. The surface area of the filter media may be, for example, at least 220 square inches, at least 230 square inches, at least 250 square inches, at least 270 square inches, at least 290 square inches, at least 310 square inches, at least 330 square inches, at least 350 square inches, or at least 370 square inches.

The filter elements may have the same property values as those noted above in connection with the filter media.

The filter media described herein may be suitable for filtering a variety of fluids. For instance, the filter media described herein may be liquid filters and/or air filters. The liquid may be water, fuel, or another fluid. For instance, the fluid may comprise diesel fuel, hydraulic fluid, oil and/or other hydrocarbon liquids. Some methods may comprise employing a filter media described herein to filter a fluid, such as to filter a liquid (e.g., water, fuel) or to filter air. The method may comprise passing a fluid (e.g., a fluid to be filtered) through the filter media. When the fluid is passed through the filter media, the components filtered from the fluid may be retained on an upstream side of the filter media and/or within the filter media. The filtrate may be passed through the filter media.

Figure 6A:
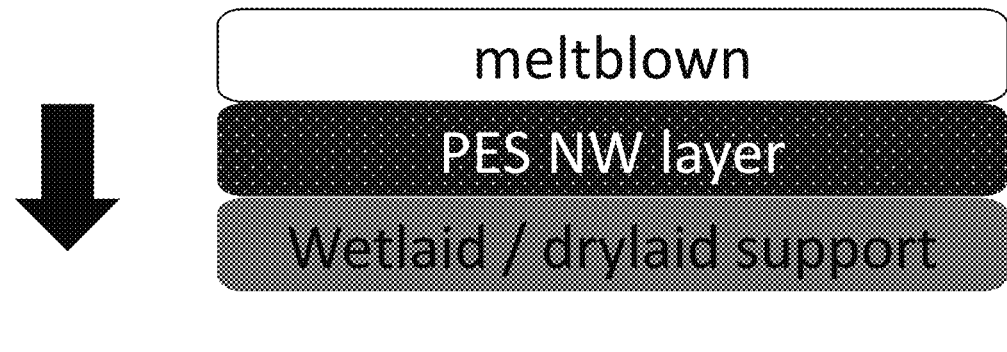
FIG. 6A and FIG. 6B each show non-limiting examples of designs suitable for HEPA filters, in accordance with some embodiments.
Figure 6B:

The filter media described herein may have a variety of suitable designs and a variety of suitable arrangements of the layers therein. Non-limiting examples of designs suitable for fuel filters are shown in FIGS. 4A-4F, non-limiting examples of designs suitable for hydraulic fluid filters are shown in FIGS. 5A-5D, non-limiting examples of designs suitable for HEPA filters are shown in FIGS. 6A-6B. The arrows shown in FIGS. 5A-5F, 6A-6D, and 7A-7B indicate the direction in which the fluid would flow through the filter media. "PES NW layer" refers to the PES-based fine fiber layer described herein. Further properties of some exemplary layers that may be included in filter media are described below in Table 1, and further properties of some exemplary filter media including these layers are described below in Tables 2-5.

TABLE 1

| | | | Exemplary layers | | | |
|---|---|---|---|---|---|---|
| Type of layer | Fiber composition | Air perm. (CFM) | Mean flow pore size (microns) | Basis weight (gsm) | Average fiber diameter (microns) | Elongation at break |
| PES-based fine fiber layer | Polyether sulfone, can be a multiblock or co-block polymer | 0.5-10, 1-10, 5-75, or 10-50 | 0.1-15, 0.5-15, 1-15, or 2-15 | 0.1-10, 0.1-3, or 0.1-5 | 0.05-0.3 | 50%-100% |
| Meltblown (may be calendered) | Nylon and/or poly(butylene terephthalate) | 0.5-10 or 5-100 | 0.1-15 or 3-25 | 5-100 or 10-100 | 0.5-10 | 1%-50% |
| Wetlaid/ drylaid layer/ support (may be spunbond, meltblown, or carded) | Synthetic and/or cellulose | 20-200 | 15-100 | 50-200 | 1-30 | 1%-20% |
| Scrim (may be spunbond or meltblown) | Poly(ester), Nylon, and/or other polymers | 50-8000 | 30-200 | 5-50 | 1-30 | 1%-50% |
| Synthetic prefilter (may be wetlaid or meltblown) | Poly(ester), Nylon, and/or other polymers | 5-100 | 3-25 | 5-100 | 0.5-30 | 1%-50% |
| Glass prefilter | Glass | 5-100 | 3-25 | 5-100 | 0.5-30 | 1%-50% |
| Spunbond | | 5-8000 | 30-200 | 5-50 | 1-30 | 1%-50% |
| Carded | | 5-8000 | 30-200 | 5-50 | 1-30 | 1%-50% |

TABLE 2

| | | | | | | |
|---|---|---|---|---|---|---|
| Design no. | Arrangement of layers (from upstream surface to downstream surface) | Air permeability (CFM) | Initial efficiency at 1.5 microns | Dust holding capacity (gsm) | Fuel-water separation efficiency | Mean flow pore size (microns) |
| 1 (shown in FIG. 4A) | 1-7 meltblown layers (together having an air permeability of 5-100 CFM, a mean flow pore size of 3-25 microns, a basis weight of 5-100 gsm, a mean fiber diameter of 0.5-10 microns, and an elongation at break of 1%-50%) PES-based fine fiber layer(having an air permeability of 0.5-10 CFM, a mean flow pore size of 0.1-15 microns, a basis weight of 0.1-10 gsm, a mean fiber diameter of 0.01-0.3 microns, and an elongation at break of 2%-80%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | 0.5-15 | 90%-99.99% | 50-300 | 80%-100% | 0.1-15 |
| 2 (shown in FIG. 4B) | Scrim (having an air permeability of 50-8000 CFM, a mean flow pore size of 30-200 microns, a basis weight of 5-50 gsm, a mean fiber diameter of 1-30 microns, and an elongation at break of 1%-50%) | 0.5-15 | 90%-99.99% | 50-300 | 80%-100% | 0.1-15 |

TABLE 2-continued

| | Exemplary Fuel Filter Media | | | | | |
|---|---|---|---|---|---|---|
| Design no. | Arrangement of layers (from upstream surface to downstream surface) | Air permeability (CFM) | Initial efficiency at 1.5 microns | Dust holding capacity (gsm) | Fuel-water separation efficiency | Mean flow pore size (microns) |
| | PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) 1-7 meltblown layers (together having an air permeability of 0.5-100 CFM, a mean flow pore size of 0.1-15 microns, a basis weight of 10-100 gsm, a mean fiber diameter of 0.5-10 microns, and an elongation at break of 1%-50%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | | | | | |
| 3 (shown in FIG. 4C) | Wetlaid or drylaid layer (having an air permeability of 20-200 CFM, a mean flow pore size of 15-100 microns, a basis weight of 50-200 gsm, a mean fiber diameter of 1-30 microns, and | 0.5-15 | 90%-99.99% | 50-300 | 80%-100% | 0.1-15 |

TABLE 2-continued

| | | | Exemplary Fuel Filter Media | | | |
|---|---|---|---|---|---|---|
| Design no. | Arrangement of layers (from upstream surface to downstream surface) | Air permeability (CFM) | Initial efficiency at 1.5 microns | Dust holding capacity (gsm) | Fuel-water separation efficiency | Mean flow pore size (microns) |
| | an elongation at break of 1%-20%) 1-7 meltblown layers (together having an air permeability of 5-100 CFM, a mean flow pore size of 3-25 microns, a basis weight of 5-100 gsm, a mean fiber diameter of 0.5-10 microns, and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Scrim (having an air permeability of 50-8000 CFM, a mean flow pore size of 30-200 microns, a basis weight of 5-50 gsm, a mean fiber diameter of 1-30 microns, and an elongation at break of 1%-50%) | | | | | |
| 4 (shown in FIG. 4D) | Carded layer (having an air permeability of 50-8000 CFM, a mean flow pore size of 30-200 microns, a basis weight of 5-50 gsm, a mean fiber diameter of 1-30 microns, | 0.5-15 | 90%-99.99% | 50-300 | 80%-100% | 0.1-15 |

TABLE 2-continued

| | Exemplary Fuel Filter Media | | | | | |
|---|---|---|---|---|---|---|
| Design no. | Arrangement of layers (from upstream surface to downstream surface) | Air permeability (CFM) | Initial efficiency at 1.5 microns | Dust holding capacity (gsm) | Fuel-water separation efficiency | Mean flow pore size (microns) |
| | and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | | | | | |
| 5 (shown in FIG. 4E) | PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Meltblown layer(having an air permeability of 0.5-10 CFM, a mean flow pore size of 0.1-15 microns, a basis weight of 10-100 gsm, a mean | 0.5-15 | 90%-99.99% | 50-300 | 80%-100% | 0.1-15 |

TABLE 2-continued

| | | | | | | |
|---|---|---|---|---|---|---|
| | | | Exemplary Fuel Filter Media | | | |
| Design no. | Arrangement of layers (from upstream surface to downstream surface) | Air permeability (CFM) | Initial efficiency at 1.5 microns | Dust holding capacity (gsm) | Fuel-water separation efficiency | Mean flow pore size (microns) |
| | fiber diameter of 0.5-10 microns, and an elongation at break of 1%-50%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | | | | | |
| 6 (shown in FIG. 4F) | PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | 0.5-15 | 90%-99.99% | 50-300 | 80%-100% | 0.1-15 |

TABLE 3

| Design no. | Arrangement of layers (from upstream surface to downstream surface) | Air permeability (CFM) | Micron rating for beta 200 efficiency (microns) | Dust holding capacity (gsm) | Mean flow pore size (microns) | Able to withstand Multipass Filter Test following the ISO 16889 (2008) procedure (modified by testing a flat sheet sample)? |
|---|---|---|---|---|---|---|
| | | | | Exemplary Hydraulic Filter Media | | |
| 7 (shown in FIG. 5A) | 1-7 synthetic prefilters (together having an air permeability of 5-100 CFM, a mean flow pore size of 3-25 microns, a basis weight of 5-100 gsm, a mean fiber diameter of 0.5-30 microns, and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Spunbond (having an air permeability of 50-8000 CFM, a mean flow pore size of 30-200 microns, a basis weight of 5-50 gsm, a mean fiber diameter of 1-30 microns, and an elongation at break of 1%-50%) | 10-50 | 2-15 | 100-300 | 0.5-15 | Yes |
| 8 (shown in FIG. 5B) | 1-7 synthetic prefilters (together having an air permeability of 5-100 CFM, a mean flow pore size of 3-25 microns, a basis weight | 10-50 | 2-12 | 100-300 | 0.5-15 | Yes |

TABLE 3-continued

| | | | | | | Able to withstand Multipass Filter Test following the ISO 16889 (2008) procedure (modified by testing a flat sheet sample)? |
|---|---|---|---|---|---|---|
| Design no. | Arrangement of layers (from upstream surface to downstream surface) | Air permeability (CFM) | Micron rating for beta 200 efficiency (microns) | Dust holding capacity (gsm) | Mean flow pore size (microns) | |
| | of 5-100 gsm, a mean fiber diameter of 0.5-30 microns, and an elongation at break of 1%-50%) Scrim (having an air permeability of 50-8000 CFM, a mean flow pore size of 30-200 microns, a basis weight of 5-50 gsm, a mean fiber diameter of 1-30 microns, and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Spunbond layer(having an air permeability of 50-8000 CFM, a mean flow pore size of 30-200 microns, a basis weight of 5-50 gsm, a mean fiber diameter of 1-30 microns, and an elongation at break of 1%-50%) | | | | | |

TABLE 3-continued

Exemplary Hydraulic Filter Media

| Design no. | Arrangement of layers (from upstream surface to downstream surface) | Air permeability (CFM) | Micron rating for beta 200 efficiency (microns) | Dust holding capacity (gsm) | Mean flow pore size (microns) | Able to withstand Multipass Filter Test following the ISO 16889 (2008) procedure (modified by testing a flat sheet sample)? |
|---|---|---|---|---|---|---|
| 9 (shown in FIG. 5C) | 1-7 glass prefilters (together having an air permeability of 5-100 CFM, a mean flow pore size of 3-25 microns, a basis weight of 5-100 gsm, a mean fiber diameter of 0.5-30 microns, and an elongation at break of 1%-50%) 1-7 meltblown layers (together having an air permeability of 5-100 CFM, a mean flow pore size of 3-25 microns, a basis weight of 5-100 gsm, a mean fiber diameter of 0.5-10 microns, and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) Spunbond layer(having an air permeability of 50-8000 CFM, a mean flow pore size of 30-200 | 10-50 | 2-12 | 100-300 | 0.5-15 | Yes |

TABLE 3-continued

| | | | | | | Able to withstand Multipass Filter Test following the ISO 16889 (2008) procedure (modified by testing a flat sheet sample)? |
|---|---|---|---|---|---|---|

Exemplary Hydraulic Filter Media

| Design no. | Arrangement of layers (from upstream surface to downstream surface) | Air permeability (CFM) | Micron rating for beta 200 efficiency (microns) | Dust holding capacity (gsm) | Mean flow pore size (microns) | Able to withstand Multipass Filter Test following the ISO 16889 (2008) procedure (modified by testing a flat sheet sample)? |
|---|---|---|---|---|---|---|
| | microns, a basis weight of 5-50 gsm, a mean fiber diameter of 1-30 microns, and an elongation at break of 1%-50%) | | | | | |
| 10 (shown in FIG. 5D) | 1-7 glass prefilters (together having an air permeability of 5-100 CFM, a mean flow pore size of 3-25 microns, a basis weight of 5-100 gsm, a mean fiber diameter of 0.5-30 microns, and an elongation at break of 1%-50%) Scrim (having an air permeability of 50-8000 CFM, a mean flow pore size of 30-200 microns, a basis weight of 5-50 gsm, a mean fiber diameter of 1-30 microns, and an elongation at break of 1%-50%) PES-based fine fiber layer(having an air permeability of 0.5-75 CFM, a mean flow pore size of 0.1-15 microns, a basis weight of 0.1-10 gsm, a mean fiber diameter of 0.01-3 microns, and an elongation at break of 2-80%) | 10-50 | 2-12 | 100-300 | 0.5-15 | Yes |

TABLE 3-continued

| | | | | | | Able to withstand Multipass Filter Test following the ISO 16889 (2008) procedure (modified by testing a flat sheet sample)? |
|---|---|---|---|---|---|---|
| Design no. | Arrangement of layers (from upstream surface to downstream surface) | Air permeability (CFM) | Micron rating for beta 200 efficiency (microns) | Dust holding capacity (gsm) | Mean flow pore size (microns) | |
| | Spunbond layer(having an air permeability of 50-8000 CFM, a mean flow pore size of 30-200 microns, a basis weight of 5-50 gsm, a mean fiber diameter of 1-30 microns, and an elongation at break of 1%-50%) | | | | | |

TABLE 4

Exemplary HEPA Filter Media

| Design no. | Arrangement of layers (from upstream surface to downstream surface) | Air permeability (CFM) | MPPS penetration | MPPS gamma | Mean flow pore size (microns) |
|---|---|---|---|---|---|
| 11 (shown in FIG. 6A) | Meltblown layer (having an air permeability of 5-100 CFM, a mean flow pore size of 3-25 microns, a basis weight of 5-100 gsm, a mean fiber diameter of 0.5-10 microns, and an elongation at break of 1%-50%) PES-based fine fiber layer (having an air permeability of 0.5-75 CFM, a mean flow pore size of 0.1-15 microns, a basis weight of 0.1-10 gsm, a mean fiber diameter of 0.01-3 microns, and an elongation at break of 2-80%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | 0.5-15 | 0.01%-1% | 30-70 | 0.1-15 |

TABLE 4-continued

| | Exemplary HEPA Filter Media | | | | |
| --- | --- | --- | --- | --- | --- |
| Design no. | Arrangement of layers (from upstream surface to downstream surface) | Air permeability (CFM) | MPPS penetration | MPPS gamma | Mean flow pore size (microns) |
| 12 (shown in FIG. 6B) | PES-based fine fiber layer (having an air permeability of 0.5-75 CFM, a mean flow pore size of 0.1-15 microns, a basis weight of 0.1-10 gsm, a mean fiber diameter of 0.01-3 microns, and an elongation at break of 2-80%) Wetlaid or drylaid layer (having an air permeability of 20-200 CFM, a mean flow pore size of 15-100 microns, a basis weight of 50-200 gsm, a mean fiber diameter of 1-30 microns, and an elongation at break of 1%-20%) | 0.5-15 | 0.01%-0.1% | 30-70 | 0.1-15 |

The following examples are intended to illustrate certain embodiments of the present invention, but do not exemplify the full scope of the invention.

Example 1

Figure 7A:
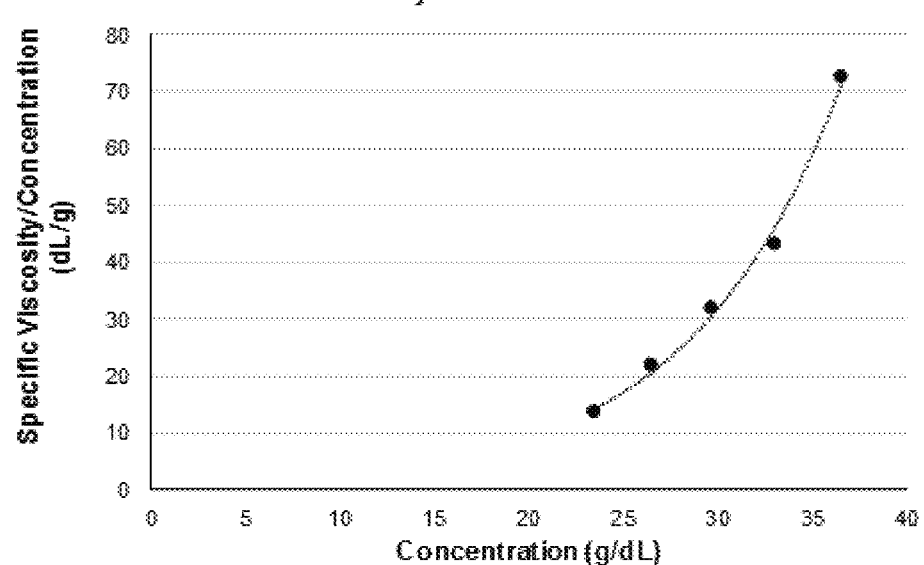
FIG. 7A is a plot of specific viscosity/concentration (dL/g) versus concentration (g/dL) of Sample A.

The intrinsic viscosities of Samples A and B were measured as described herein. Five concentrations of Sample A were exponentially plotted, as shown in FIG. 7A, to determine the intrinsic viscosity of Sample A. The plotted values were calculated as shown in Table 5 (where the Conc (g/dL) and $\eta$intrinsic columns represent the plotted x-axis and y-axis values).

TABLE 5

| | | | | | | | | | | | | | |
| --- | --- | --- | --- | --- | --- | --- | --- | --- | --- | --- | --- | --- | --- |
| | | | | | Calculation of Values to Plot to Determine Intrinsic Viscosity of Sample A | | | | | | | | |
| conc (g/g) | $\eta_{solution}$ | Solvent | Solvent density | Solvent weight | Solvent volume | $\eta_{solvent}$ | Conc (g/mL) | Conc (g/dL) | $\eta_{intrinsic}$ | $\eta_{sp}$ | Relative Viscosity | $\eta_{red}$ or $\eta_i$ |
| 20 | 149.5 | DMAc | 0.94 | 80 | 85.11 | 0.95 | 0.24 | 23.50 | 6.69 | 157.20 | 158.20 | 6.73 |
| 22 | 236.7 | DMAc | 0.94 | 78 | 82.98 | 0.95 | 0.27 | 26.51 | 9.41 | 249.48 | 250.48 | 9.45 |
| 24 | 379.9 | DMAc | 0.94 | 76 | 80.85 | 0.95 | 0.30 | 29.68 | 13.51 | 401.01 | 402.01 | 13.54 |
| 26 | 602.3 | DMAc | 0.94 | 74 | 78.72 | 0.95 | 0.33 | 33.03 | 19.27 | 636.35 | 637.35 | 19.30 |
| 28 | 939.5 | DMAc | 0.94 | 72 | 76.60 | 0.95 | 0.37 | 36.56 | 27.17 | 993.18 | 994.18 | 27.20 |

Figure 7B:
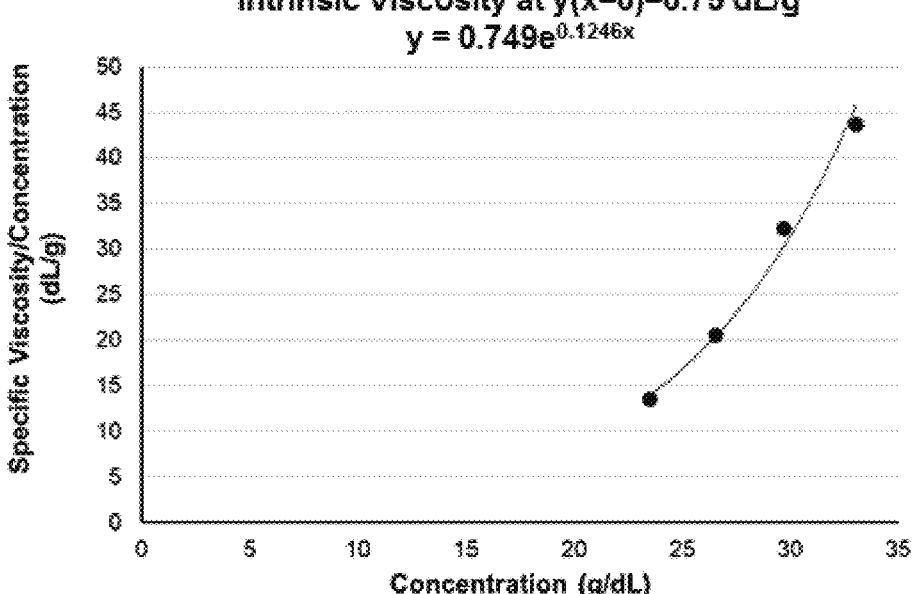
FIG. 7B is a plot of specific viscosity/concentration (dL/g) versus concentration (g/dL) of Sample B.

Similarly, four concentrations of Sample B were exponentially plotted, as shown in FIG. 7B, to determine the intrinsic viscosity of Sample B, and the plotted values were calculated as shown in Table 6 (where the Conc (g/dL) and $\eta$intrinsic columns represent the plotted x-axis and y-axis values).

TABLE 6

| | | | | | | | | | | | | | |
| --- | --- | --- | --- | --- | --- | --- | --- | --- | --- | --- | --- | --- | --- |
| | | | | | Calculation of Values to Plot to Determine Intrinsic Viscosity of Sample B | | | | | | | | |
| conc (g/g) | $\eta_{solution}$ | Solvent | Solvent density | Solvent weight | Solvent volume | $\eta_{solvent}$ | Conc (g/mL) | Conc (g/dL) | $\eta_{intrinsic}$ | $\eta_{sp}$ | Relative Viscosity | $\eta_{red}$ or $\eta_i$ |
| 20 | 302.3 | DMAc | 0.94 | 80 | 85.11 | 0.95 | 0.24 | 23.50 | 13.57 | 318.89 | 319.89 | 13.61 |
| 22 | 516.8 | DMAc | 0.94 | 78 | 82.98 | 0.95 | 0.27 | 26.51 | 20.59 | 545.88 | 546.88 | 20.63 |
| 24 | 907.2 | DMAc | 0.94 | 76 | 80.85 | 0.95 | 0.3 | 29.68 | 32.31 | 959 | 960 | 32.34 |
| 26 | 1367 | DMAc | 0.94 | 74 | 78.72 | 0.95 | 0.33 | 33.03 | 43.77 | 1445.56 | 1446.56 | 43.8 |

Samples A and B had similar intrinsic viscosities (0.78 dL/g and 0.75 dL/g, respectively). The number of macro defects (i.e., defects larger than 10 microns) in Samples A and B were measured visually. An 8"×8" sample of each PES material was placed on black cardboard and covered by a transparent film to protect it from damage due to external factors. It was then scanned into a black and white JPEG image with a resolution of 600 dpi. The JPEG image was analyzed with an image color analyzer (e.g., using an online site such as http://mkweb.bcgsc.ca/color-summarizer/?) that converted the image into pixels with specific locations and RGB (red green blue) values. The RGB values ranged from 255,255,255 (which represents the color white) and 0,0,0 (which represents the color black). The data was exported into an excel file an RGB value for each XY coordinate. RGB values less than 225 indicated a defect location.

As shown in Table 7, Sample A had over 6 times as many visual macro defects as Sample B, which had a lower PDI, even though the two samples had similar intrinsic viscosities. Thus, without wishing to be bound by theory, it is believed that lowering PDI decreases the number of macro defects. Without wishing to be bound by theory, it is believed that PES material with higher PDI typically has more shorter polymer chains, which may contribute to defect formation, as short polymer chains can relax quicker than long polymer chains and they can end up forming spherical droplets and deposits on the nanoweb as shot or forming holes. In some embodiments, reduced macro defects results in improved filtration efficiency and/or improved mechanical properties (e.g., increased elongation at break and/or tensile strength), such that it can be pleated in post-treatment.

The elongation at break of Samples A and B was measured according to according to ASTM D 5034 (2009). Comparison of Sample A to Sample B in Table 7 demonstrates that elongation at break was significantly higher in Sample B, which had a lower PDI, even though the two samples had similar intrinsic viscosities. Thus, without wishing to be bound by theory, it is believed that lowering PDI increases elongation at break.

The tensile strength of a layer comprising either Sample A or Sample B was measured according to ASTM D 5034 (2009). Comparison of Sample A to Sample B in Table 7 demonstrated that tensile strength was significantly higher in Sample B, which had a lower PDI, even though the two samples had similar intrinsic viscosities. Thus, without wishing to be bound by theory, it is believed that lowering PDI increases tensile strength.

TABLE 7

| | | | | Number of Visual Macro | |
| PES Material | Intrinsic Viscosity (dL/g) | PDI | Elongation at break (%) | Defects/ Square meter | Tensile Strength (MPa) of a layer |
| --- | --- | --- | --- | --- | --- |
| Sample A | 0.78 | 3.3 | 4.5 | 68 | 0.045 |
| Sample B | 0.75 | 2.1 | 16.9 | 10 | 0.26 |

Figure 8A:
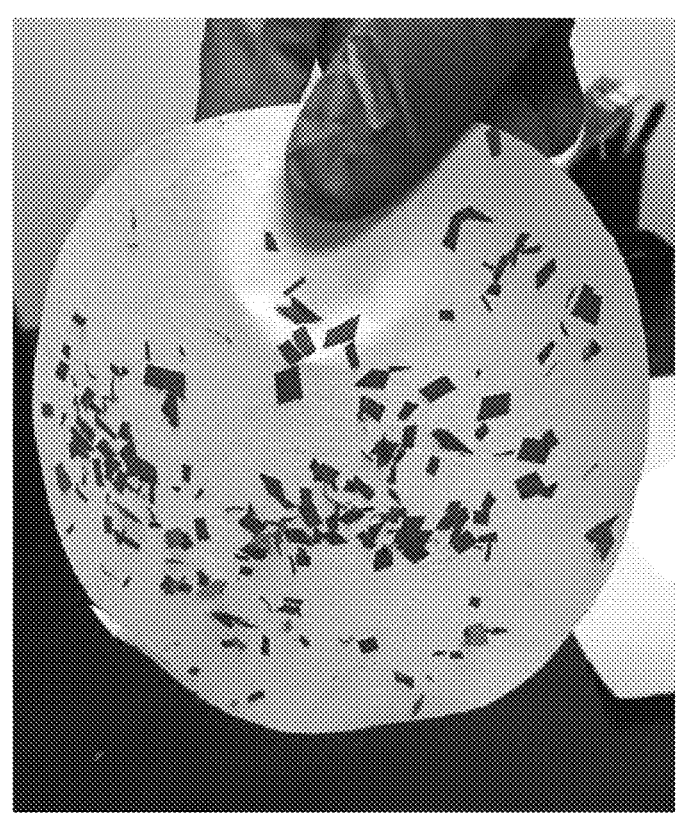
FIG. 8A is a photo of the static effect of Sample A on shredded paper.
Figure 8B:
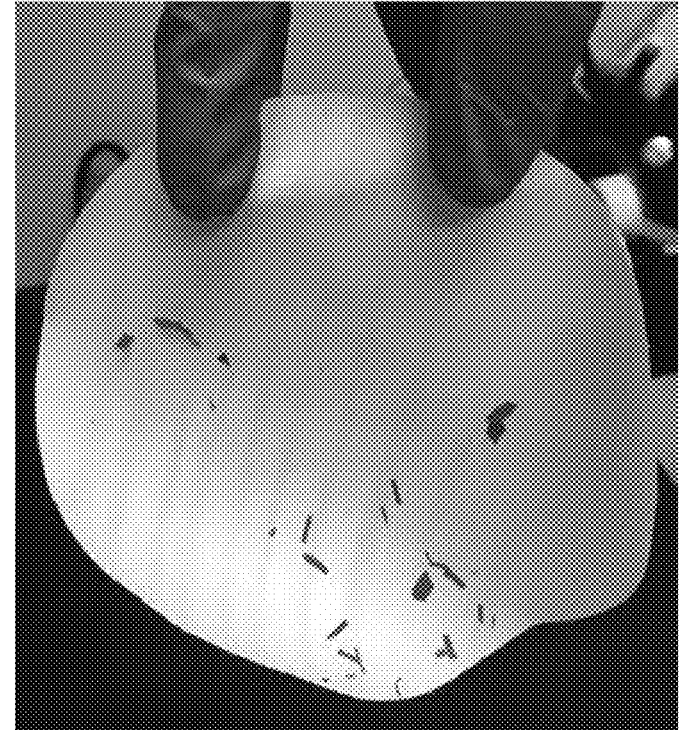
FIG. 8B is a photo of the static effect of Sample B on shredded paper.

Sample B comprised anti-static PES material. The static of Samples A and B was studied. 8" circles of each sample were placed over shredded paper. They were then picked up and the amount of shredded paper that clung to the sample (due to static forces) was visually inspected. As shown in FIG. 8, Sample B (FIG. 8B), has less static than Sample A (FIG. 8A).

Example 2

This example describes the filtration properties of a filter media comprising a meltblown support layer and a poly (ether sulfone) nanofiber layer (efficiency layer) compared to commercial comparators.

The support layer was a pre-calendered poly(butylene terephthalate) (PBT) meltblown layer with a basis weight of 40 g/m². The nanofiber layer (efficiency layer) comprised PES material (Sample B from Example 2) and had a basis weight of 5 g/m² and an average fiber diameter of 180 nm, directly adjacent to and formed on the PBT meltblown layer by electrospinning to form a PBT/PES construct. The PBT/PES construct was laminated with a second PBT meltblown layer (basis weight 26 g/m²), positioned directly adjacent to the other side of the nanofiber layer to form a laminated composite. This media was compared with commercially available microfiltration PES membranes in Table 8.

The overall liquid filtration efficiency was tested as described above. The maximum pore size and mean flow pore size were measured according to ASTM F316 (2003) at 15 PSI. Air permeability was measured according to ASTM D737-04 (2016) at a pressure of 125 Pa and at 10" water (ca. 2488 Pas). Basis weight was measured according to TAPPI 410 (2013). Thickness was measured using a thickness measuring gauge, as described above. Fiber diameter was measured using scanning electron microscopy.

As shown in Table 8, the filter media comprising a meltblown support layer and a poly(ether sulfone) nanofiber layer (efficiency layer) had better 0.2 micron efficiency and air permeability than the comparators.

TABLE 8

| | | | | | | Ratio of Max | |
| Filter media | Basis weight (g/m²) | Thickness (mil) | Air Perm. (CFM) at 2488.4 Pa | MFP (μm) | Max Pore (μm) | Pore/ MFP | 0.2 μm Efficiency (%) |
| --- | --- | --- | --- | --- | --- | --- | --- |
| PES fiber filter media | 75 | 9.3 | 38.6 | 0.48 | 1.2 | 2.5 | 90 |
| *Membrane PES - 0.45 μm Vendor 1 | 31 | 4.7 | 13.5 | 0.37 | 0.85 | 2.3 | 48 |

TABLE 8-continued

| | Basis weight (g/m$^2$) | Thickness (mil) | Air Perm. (CFM) at 2488.4 Pa | MFP (μm) | Max Pore (μm) | Ratio of Max Pore/ MFP | 0.2 μm Efficiency (%) |
|---|---|---|---|---|---|---|---|
| Filter media | | | | | | | |
| *Membrane PES - 0.45 μm Vendor2 | | | | | | | 37 |
| *Membrane PES - 0.45 μm Vendor3 | 42.6 | 5.5 | 14.6 | 0.36 | 0.66 | 1.85 | 20 |
| *Membrane PES - 0.2 μm Vendor4 | | | | 0.32 | 0.42 | 1.32 | 55 |

Properties of Various Filter Media

*Commercially available microfiltration PES membranes

Example 3

This example compares the filtration properties of a filter element disclosed herein (Filter Element Z) versus a commercial filter element (Filter Element Y).

Filter Element Y was a commercial filter element comprising a polyethersulfone hydrophilic membrane with an absolute rating of 0.45 micron membrane filter.

Filter Element Z was formed by electro spinning a PES fiber web onto a calendered polybutylene terephtalate melt-blown fiber web (support layer) and bonding a second polybutylene terephtalate meltblown fiber web to the electrospun web with a flatbed laminator. The PES fiber web comprised PES material (Sample B from Example 1).

To form the cartridge element comprising filter media Z, the filter media was fed in roll format together with a layer of polypropylene scrim on the upstream side and two layers of polypropylene scrim on the downstream side, to a blade pleater to create 1.27 cm pleat height across the media and the scrim layers. The pleated scrim-support media was cut to an appropriate length and seamed to form an open-ended cylinder. The pleated media cylinder was inserted into a cartridge housing and enclosed by means of heat sealing the end caps of the housing.

As shown in Table 9, Filter Element Z had comparable efficiency, better pressure drop for clean water flow, and better dust holding capacity than Filter Element Y. The basis weight, thickness, air permeability, mean flow pore size, and maximum pore size were measured as described in Example 2.

Pressure drop was measured based on IFTS protocol FEEIS-01:2013, using microfiltered water at a 20 L/min flow rate and a temperature of 23° C. Dust holding capacity and average efficiency were tested according to EN-13443-2 (2007) (as described in more detail above).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively pres-

TABLE 9

| Filter Element | Basis weight (g/m$^2$) | Thickness (mil) | Air Perm (CFM) (e.g., at 2488.4 Pa) | Mean Flow Pore (micron) | Max Pore (micron) | 0.4 μm Efficiency (%) | 0.6 μm Efficiency (%) | Pressure drop (kPa) | Dust holding capacity |
|---|---|---|---|---|---|---|---|---|---|
| Y | | | | | | 98.9 | 100 | 19.8 | 22.5 |
| Z | 75 | 9.3 | 38.6 | 0.48 | 1.2 | 98.46 | 100 | 13.4 | 26.8 |

Filtration performance of Filter Elements ent in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

What is claimed is:

1. A filter media, comprising:
a PES-based fine fiber layer comprising a plurality of fine fibers comprising a polyethersulfone (PES) material;
wherein the PES material has a polydispersity index of greater than or equal to 1.9 and less than 2.6;

wherein the PES material has an intrinsic viscosity of greater than 0.3 dL/g and less than or equal to 2 dL/g;

wherein the PES-based fine fiber layer has a dust holding capacity of greater than or equal to 2 gsm and less than or equal to 300 gsm;

wherein the PES-based fine fiber layer has a surface area of greater than or equal to 4 $m^2/g$ and less than or equal to 10 $m^2/g$;

wherein the filter media further comprises an additional layer;

wherein the additional layer comprises meltblown fibers;

wherein the additional layer comprises a pre-calendered additional layer; and wherein the filter media has a thickness of greater than or equal to 0.001 mm and less than or equal to 0.5 mm.

2. The filter media of claim 1, wherein the PES material has an intrinsic viscosity of greater than or equal to 0.35 dL/g and less than or equal to 2 dL/g.

3. The filter media of claim 2, wherein the PES material has an intrinsic viscosity of greater than or equal to 0.4 dL/g and less than or equal to 2 dL/g.

4. The filter media of claim 2, wherein the PES material has a polydispersity index of greater than or equal to 2.0 and less than 2.6.

5. The filter media of claim 2, wherein the PES material has a polydispersity index of greater than or equal to 2.1 and less than 2.6.

6. The filter media of claim 2, wherein the fine fibers are electrospun.

7. The filter media of claim 2, wherein the PES-based fine fiber layer comprises less than 1,790 macro defects per square meter.

8. The filter media of claim 2, wherein the PES-based fine fiber layer comprises less than 107 macro defects per square meter.

9. The filter media of claim 2, wherein the PES-based fine fiber layer has an elongation at break of greater than or equal to 2% and less than or equal to 80%.

10. The filter media of claim 2, wherein the PES-based fine fiber layer has an elongation at break of greater than or equal to 10% and less than or equal to 80%.

11. The filter media of claim 2, wherein the PES-based fine fiber layer has a tensile strength of greater than or equal to 0.1 MPa and less than or equal to 5 MPa.

12. The filter media of claim 2, wherein the PES-based fine fiber layer has a tensile strength of greater than or equal to 0.1 MPa and less than or equal to 0.4 MPa.

13. The filter media of claim 2, wherein the PES-based fine fiber layer has a ratio of maximum pore size to mean flow pore size of less than or equal to 15:1.

14. The filter media of claim 2, wherein the PES-based fine fiber layer comprises anti-static PES material.

15. The filter media of claim 2, wherein the filter media further comprises a support layer.

16. The filter media of claim 15, wherein a ratio of the average fiber diameter of the PES-based fine fiber layer to a maximum pore size of the support layer is greater than or equal to 0.003:1 and less than or equal to 0.8:1.

17. The filter media of claim 15, wherein the support layer comprises fibers selected from the group consisting of synthetic fibers, cellulose fibers, and/or glass fibers.

18. The filter media of claim 1, wherein the PES material has an intrinsic viscosity of greater than or equal to 0.3 dL/g and less than or equal to 0.9 dL/g.

19. The filter media of claim 1, wherein the fine fibers have an average fiber diameter of greater than or equal to 300 nm and less than or equal to 6 microns.

20. The filter media of claim 1, wherein the filter media has a thickness of greater than or equal to 0.1 mm and less than or equal to 0.5 mm.

21. The filter media of claim 1, wherein the meltblown fibers comprise poly(olefin), poly(ester), poly(vinyl alcohol), poly(acrylic), fluorinated polymer, and/or cellulose acetate.

\* \* \* \* \*